US012347290B1

(12) United States Patent
Peng et al.

(10) Patent No.: US 12,347,290 B1
(45) Date of Patent: Jul. 1, 2025

(54) CHIPSET LEVEL INTRUSION DETECTION

(71) Applicant: Amazon Technologies, Inc., Seattle, WA (US)

(72) Inventors: Tan Peng, Saratoga, CA (US); Ali Rahbar, Bellevue, WA (US); Donghyun Choi, Yongin-si (KR); Eric Dalci, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 190 days.

(21) Appl. No.: 18/341,570

(22) Filed: Jun. 26, 2023

(51) Int. Cl.
*G08B 13/196* (2006.01)

(52) U.S. Cl.
CPC . *G08B 13/19682* (2013.01); *G08B 13/19656* (2013.01)

(58) Field of Classification Search
CPC ........ G08B 13/19682; G08B 13/19656; H05K 1/0275
USPC ........................... 348/143; 340/540; 713/176
See application file for complete search history.

(56) References Cited

U.S. PATENT DOCUMENTS 5,428,388 A 6/1995 von Bauer et al.
7,193,644 B2 3/2007 Carter
8,139,098 B2 3/2012 Carter
8,144,183 B2 3/2012 Carter
8,154,581 B2 4/2012 Carter
8,780,201 B1 7/2014 Scalisi et al.
8,823,795 B1 9/2014 Scalisi et al.
8,842,180 B1 9/2014 Kasmir et al.
8,872,915 B1 10/2014 Scalisi et al.
8,937,659 B1 1/2015 Scalisi et al.
8,941,736 B1 1/2015 Scalisi
8,947,530 B1 2/2015 Scalisi
8,953,040 B1 2/2015 Scalisi et al.
9,013,575 B2 4/2015 Scalisi
9,049,352 B2 6/2015 Scalisi et al.
9,053,622 B2 6/2015 Scalisi
9,058,738 B1 6/2015 Scalisi
9,060,103 B2 6/2015 Scalisi
9,060,104 B2 6/2015 Scalisi
9,065,987 B2 6/2015 Kasmir et al.
9,071,446 B2 * 6/2015 Kreft ..................... H04L 9/3278
9,094,584 B2 7/2015 Scalisi et al.
9,113,051 B1 8/2015 Scalisi
9,113,052 B1 8/2015 Scalisi et al.
9,118,819 B1 8/2015 Scalisi et al.
9,142,214 B2 9/2015 Scalisi
9,160,987 B1 10/2015 Kasmir et al.
(Continued)

*Primary Examiner* — Thai Q Tran
*Assistant Examiner* — Stephen R Smith
(74) *Attorney, Agent, or Firm* — Eversheds Sutherland (US) LLP

(57) ABSTRACT

A device includes a general purpose input/output (GPIO) pin and a chipset that has a bootloader component, a secure driver component, and a countermeasure handler component. The bootloader component loads an intrusion detection (ID) configuration for detecting intrusion events at the device, authenticates the ID configuration, and initializes the countermeasure handler component. The secure driver component receives, from the GPIO pin, an electrical signal associated with a hardware interrupt at the device and causes a notification to be provided to a user associated with the device. The counter secure driver component also perform at least one countermeasure in response to the intrusion event.

27 Claims, 10 Drawing Sheets

(56) References Cited

U.S. PATENT DOCUMENTS

| | | | |
|---|---|---|---|
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 11,704,431 B2 * | 7/2023 | Kraus | H04L 63/0414 726/26 |
| 2007/0008081 A1 | 1/2007 | Tylicki et al. | |
| 2009/0320110 A1 * | 12/2009 | Nicolson | H04L 9/3268 713/176 |
| 2010/0225455 A1 | 9/2010 | Claiborne et al. | |
| 2014/0267716 A1 | 9/2014 | Child et al. | |
| 2015/0163463 A1 | 6/2015 | Hwang et al. | |
| 2018/0114039 A1 * | 4/2018 | Sion | H05K 1/0275 |
| 2021/0117546 A1 * | 4/2021 | Finchelstein | G06F 12/0284 |
| 2022/0375197 A1 * | 11/2022 | Takatsuka | G06V 10/761 |
| 2023/0154349 A1 * | 5/2023 | Toy | G06F 9/542 434/29 |

* cited by examiner

CHIPSET LEVEL INTRUSION DETECTION

BACKGROUND

Businesses and individuals are becoming more connected with the proliferation of devices such as desktops, tablets, entertainment systems, security cameras, and portable communication devices. Unfortunately, with this proliferation comes threats against these devices. For example, devices may be manipulated or tampered with for unauthorized use, which may lead to the dissemination of sensitive information, invasion of privacy, and so forth. Intrusion Detection Systems (IDS), in addition to antivirus or other software, exist to monitor for malicious activity or policy violations on the devices. In such instances, IDS's may detect and report security problems by monitoring the device, network, or system activities for malicious or anomalous behavior.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
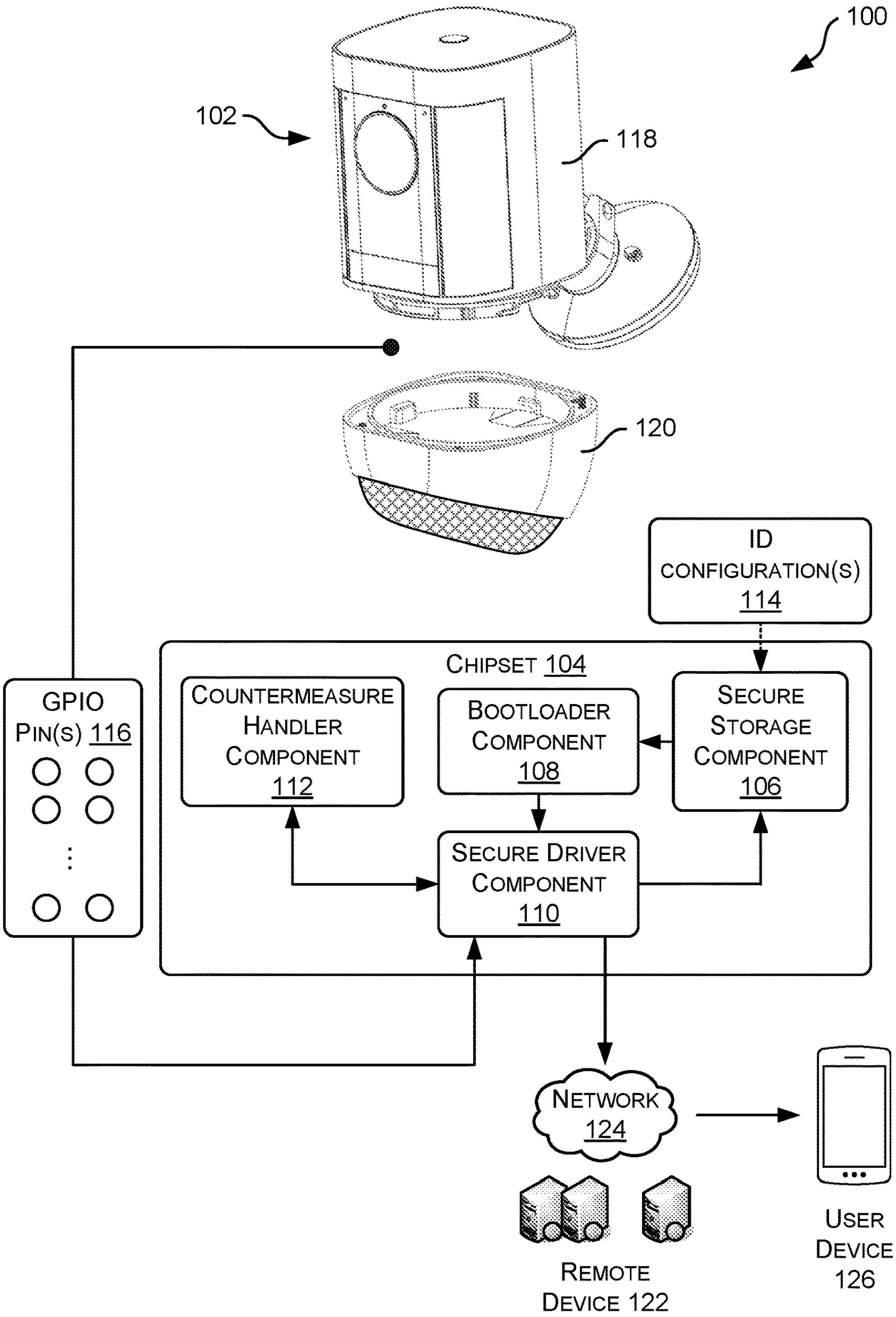
FIG. 1 illustrates an example device including a chipset level intrusion device (ID) system, according to examples of the present disclosure.

This patent application is directed, at least in part, to a chipset level intrusion detection (ID) system for detecting instruction events at a device and instituting one or more countermeasures based on detection of the intrusion event. In some instances, the chipset level ID system may detect, via a hardwire interrupt using one or more general purpose input/output (GPIO) pins, a physical intrusion or tampering of the device or components thereof, such as a cover of the device being opened. For example, the chipset level ID system may receive an indication associated with the interrupt via the GPIO pin, and in response, institute one or more countermeasures. In some instances, the one or more countermeasures may be user-defined and serve to protect sensitive information on the device that may otherwise be extracted or manipulated by unauthorized person(s). Additionally, in response to the intrusion event, the chipset level ID system may record an indication of the intrusion event for creating a log of intrusions events having occurred at the device. The chipset level ID system may therefore detect intrusion events and perform countermeasures to protect sensitive information stored on or accessible by the device as a way to increase user experiences.

In some instances, the chipset level ID system may include different components depending upon whether a trusted execution environment (TEE) is present on the device. For example, certain devices may have a TEE while other devices may not. Initially, a determination may made as to whether TEE is present or not for purposes of configuring the chipset level ID system. For example, in instances in which TEE is not present, the chipset level ID system may include a secure storage component, a bootloader component, a secure driver component, and a countermeasure handler component. Discussion of the chipset level ID system without TEE is discussed first herein, and then the chipset level ID system with TEE will later be described. In some instances, the chipset level ID system may operate in non-TEE or in TEE. For example, the chipset level ID system may be offered as a generic feature, or add-on feature, for devices.

The secure storage component may include replay protection, for example, replay protected memory block (RPMB) for embedded MultiMediaCard (eMMC) or replay protected monotonic counter (RPMC) for flash. The secure storage component may be embedded on a portion of memory of the device, and may store ID configurations, such as whether ID is enabled or disabled, countermeasures to be undertaken in response to detecting an intrusion event, creating the log of the intrusion events, and so forth. As will be explained herein, the ID configurations may be user-defined and/or factory-defined, and the chipset level ID system is configured to carry out or operate according to the ID configuration(s).

The bootloader component may authenticate and load the ID configuration(s) from the secure storage component. In addition, the bootloader component may load, authenticate, and run the secure driver component, as well as provide the ID configuration(s) to the secure driver component. The bootloader component may utilize Rivest-Shamir-Adleman (RSA) or Elliptic Curve Cryptography (ECC) based authentication to authenticate the ID configuration(s).

In some instances, where a hash value generated based on an ID configuration was previously used together with a key (e.g. a private key) to generate a signature that is then stored in association with content data representing the ID configuration, to authenticate the content data representing the ID configuration, the signature may be decrypted (e.g. with a public key) to determine a decrypted hash value for the content data, and the content data may be used to generate a new hash value for the content data, with the new hash value being compared to the decrypted hash value to authenticate the content data.

In some instances, to authenticate one or more ID configuration(s), a signature may be stored or associated with the ID configuration(s) which is used to sign the hash value, where the hash value of the ID configuration(s) is calculated by hashing the entire ID configurations. A newly calculated hash value may then be compared against a decrypted hash value to ensure the ID configurations are properly authenticated and that the integrity is checked. The signature itself may be generated from the ID configuration(s) and the private signing key. If the hashed value of the ID configuration(s) are matched, this may indicate that the ID configuration(s) have not been tampered with, and the secure driver component may safely utilize the ID configuration(s). Alternatively, if the ID configuration(s) are not authenticated, this may indicate a tampering of the ID configuration(s) and the ID configuration(s) may not be propagated throughout the remaining components of the chipset level ID system.

In some instances, an ID configuration and/or a hash value generated based on an ID configuration may have previously been used together with a key (e.g. a private key) to generate a signature that is then stored in association with content data representing the ID configuration. To authenticate the content data representing the ID configuration, the content data and/or a hash value generated based on the content data may be used together with a key (e.g. the private key) to generate a new signature to compare to the stored signature. If the signatures match, the content data has been authenticated.

The secure driver component initializes the countermeasure handler component. When the secure driver component receives an indication of the interrupt, via one of the GPIO pins, the secure driver component notifies the countermeasure handler component. The countermeasure handler component provides the secure driver component with a response that indicates the countermeasures to be undertaken. At this point, the secure driver component performs the countermeasures. The chipset level ID system may be interrupt-based, meaning that the chipset level ID system may not run or consume power during normal operation. However, when an interrupt is detected via GPIO, the chipset level ID system may operate and begin performing the countermeasures.

As introduced above, the chipset level ID system may be configured to detect the intrusion events via the GPIO pins. In some instances, the intrusion events that the chipset level ID system is configured to detect, or respond to, may be user-defined, based on a type of the chipset, and/or based on specifics of the device. For example, the user may define which intrusion events the user would like to be notified of, and/or which intrusion events the device is configured to detect (e.g., via the interrupts). Additionally, or alternatively, the types of intrusion events the chipset level ID system is configured to detect and respond to may be based on the type of the device, and specific components of the device. In other words, being as the secure driver component may receive interrupts indicative of the intrusion events via the GPIO pins, the GPIO pins may be specific to the device itself. For example, the device may include different latches, switches, sensors, etc. that are configured to provide interrupts in response to different types of intrusion events, such as opening of a first cover of the device, opening of a second cover of the device, removing a battery of the device, disconnecting the device from power, intruding the chipset of the device (e.g., installing, adding, or replacing components), a battery exhaustion of the device, and so forth. The latches, switches, sensors, etc. of the device may be connected to a corresponding GPIO pin, and in response to the latches, switches, sensors, etc. being tampered or physically manipulated, the secure driver component may receive an indication of the interrupt via the corresponding GPIO pin. Based upon which GPIO pin the secure driver component receives the interrupt from may indicate the type of intrusion event detected.

The device may be configured with any number of GPIO pins, and the secure driver component may be configured to receive the interrupts from any number of GPIO pins. The interrupt may be provided as an electrical signal with an appropriate voltage and polarity in order to trigger detection of the intrusion event. Accordingly, the latches, switches, sensors, etc. connected to the GPIO pins, as well as the interrupts received, may be specific to the device.

In some instances, a user (e.g., owner of the device, authorized user, etc.) may define the types of interrupts that the secure driver is configured to receive. For example, while the secure driver component may be capable of receiving four different interrupts from four different GPIO pins, the user of the device may limit interrupts to an opening of a cover of the device. In these instances, if the battery of the device is exhausted, the interrupt provided by a corresponding GPIO pin may be ignored and/or the interrupt may not treated as an intrusion event. The user may therefore configure the device according to certain intrusion events.

Once an intrusion event is detected, as indicated above, the secure driver component may notify the countermeasure handler component. In response, the countermeasure handler component provides the secure driver component with the countermeasures to be undertaken. In some instances, the countermeasures include, but are not limited to, logging a time stamp of the intrusion event, powering off the device, clearing secrets, keys, credentials, and/or other sensitive information stored on the device, cryptographically signing and sending an ID log of the intrusion events to a remote device, and so forth. However, other countermeasures are envisioned. In some instances, the countermeasures may be configured, or set, by the user and saved on the secure storage component of the device during configuration. For example, the user may determine the countermeasure(s) to be performed in response to the intrusion event. In some instances, the user may set different countermeasure(s) depending upon the type of intrusion event detected. For example, for a first type of intrusion event (e.g., loss of power), first countermeasure(s) may be performed, and for a second type of intrusion event (e.g., opening of a cover), second countermeasure(s) may be performed. The user may have the ability to set the countermeasure(s), as well as the number of countermeasure(s) to be performed. Although certain types of intrusion events are described, other intrusion events may be envisioned.

The user may also be notified, or provided with an indication, of the intrusion event. For example, in response to detecting the intrusion event, the secure driver component may communicate with a remote device (e.g., cloud service, etc.). The remote device or other intermediary device, system, etc. may therein cause the notification to be sent to a user device of the user (e.g., mobile phone, laptop, etc.), thereby notifying the user of the intrusion event. In some instances, the user may have the ability to respond to the intrusion event, such as causing the countermeasure(s) to be performed, terminating the countermeasure(s), and so forth. The notification may additionally or alternatively include information associated with the intrusion event, such as a time associated with the intrusion event, the type of intrusion event, and so forth.

The detection of the intrusion event is also used to create, or populate, an ID log. For example, the secure storage component may store a log of the intrusion events detected at the device. In some instances, the secure driver component may sense the interrupt via a status value (e.g., counter) of the log being registered. In response to detection of the intrusion event, the secure driver component may record (e.g., save) the intrusion event in the secure storage driver along with an indication of the time at which the intrusion event was detected, a type of the intrusion event, a battery power of the device at the time of the intrusion event, etc. However, other information associated with the device, at or during the intrusion event, may be stored in the log. In addition to the log being stored locally at the device, on the secure storage component, the secure driver component may also send (e.g., upload) the log of intrusion events to the remote device. The secure driver component may cryptographically sign the log for attestation. For example, the log may be sent to the remote device and used by the remote device to attest to the intrusion events, or lack thereof, at the device.

The log may be used by remote device, for example, to know that an intrusion event occurred, when the intrusion event occurred, as well as whether data generated from the device is attested. For example, the device may be equipped with various sensor(s), such as camera(s), microphone(s), passive infrared (PIR) sensor(s), and so forth. If an intrusion event occurred, data generated by the sensor(s) after the intrusion event may be untrustworthy being as the device may have been tampered with. In other words, based on the intrusion event being detected, the data generated by the sensor(s) may not be attested to by the remote device. On the other hand, if the device has not be tampered with, the log is used to attest to the trustworthiness of the data generated via the device. More generally, the remote device is used to attest to the status of the device, such as whether or not an intrusion event has been detected.

Using the logs of the device, the remote device may be configured to provide a snapshot of those devices that have experienced an intrusion event and/or those devices that have not experienced an intrusion event. For example, across a network, within an environment, etc., any number of devices may be used. Each of the devices may include a response chipset level ID system that communicates with the remote device (whether directly or indirectly). The snapshot may provide a graphical interface that indicates the health of the devices, those device(s) in which an intrusion event has been detected (e.g., with a red icon, indication, etc.), those device(s) in which an intrusion event has not been detected (e.g., with a green icon, indication, etc.), etc. This snapshot may be used by the user, administrator(s), etc. for serving the device(s), installing updates, commissioning or decommissioning device(s), and so forth.

In some instances, the device is configured to detect event(s) in addition to intrusion events, and not all event(s) may be considered an intrusion event for carrying out the countermeasure(s). For example, authorized users (e.g., user, service technician, etc.) may service or otherwise perform maintenance on the device. During routine maintenance a user, for example, may replace a battery of the device that has been depleted. Here, the chipset level ID system, or the secure driver component, may sense the interrupt when a cover of the device has been removed to access the battery. In response, the user may receive a notification on the user device indicating the interrupt (or a potential intrusion event). The user, via providing input to the user device, may verify their identity, provide a password, etc. and in response, the event will not be considered as an intrusion event and the countermeasures may not be undertaken. However, the event may be recorded in the log on the secure storage component, and/or sent to the remote device, but the event itself may not be considered an intrusion event. Importantly, however, the event not being considered an intrusion event has the effect of continuing to trust the data generated by the device (e.g., the device has not been tampered with), in comparison in which an intrusion event is detected. As such, the log may indicate all event(s) experienced at, or by, the device, but only certain events may be considered an intrusion event.

In some instances, the user may have the ability to set the threshold amount of time by which the user provides an indication to either confirm or deny the event as an intrusion event. A lack of response by the user, for example, or if the user fails to respond within the threshold amount of time, may indicate the event as an intrusion event for performing the user defined countermeasure(s). Additionally, in the event that an intrusion event occurs, and the countermeasure(s) are performed, the device may be serviced to address any tampering or physical intrusion of the device. For example, an authorized service center may regain access to the device to perform service. Without losing generality, in some instances, the authorized service center may conduct an authentication process using a challenge and response security process by authenticating and connecting to the back-end cloud server to convert the device into service mode. Under the service mode, the intrusion detection is temporally disabled such that that service routines may be performed on the device without triggering intrusion detection. The service center may be capable of further determining whether the hardware of the device has been tampered with and/or whether the ID configuration(s) need to be changed.

To briefly illustrate an intrusion event, consider a device that has a cover that may be removed to access an interior of the device. Upon opening of the cover, a GPIO pin of the device may provide a signal that is received via the secure driver component. For example, a latch hardware connected to the GPIO pin may generate an electrical signal to the internal pin of the chipset as an interrupt. This electrical signal may be provided with an appropriate voltage and polarity in order to trigger the intrusion event. When the signal is received, a status value (e.g., counter) of the log is registered, causing the secure driver component to detect the interrupt. In response, the secure driver component may save a time associated with the intrusion event and log the intrusion event into the secure storage component. Noted above, the log may indicate the time, battery power, type of intrusion event, etc. The secure driver component additionally notifies the countermeasure handler component, and receives a response from the countermeasure handler component associated with the countermeasures to be carried out. After receiving the response, the secure driver component carries out the countermeasures such as, for example, forcibly powering off the device to protect sensitive information that may be extracted from unauthorized person(s) accessing the device. A notification of the intrusion event is also sent to the remote device in order to remotely attest to the intrusion event, or the log of intrusion events as stored in the secure storage component. The user of the device may also be provided an indication of the intrusion event that indicates, for example, that the device has been tampered.

Upon a reboot the of device, such as when power is lost and then reestablished and/or after the intrusion event, the bootloader component authenticates and loads the ID configuration(s). The bootloader component loads, authenticates, and runs the secure driver component, and passes the ID configuration(s) onto the secure device component. The secure driver component initializes the countermeasure handler component and waits for an interrupt in response to an event. If the chipset level ID system has never been configured before (e.g., brand new, as part of an out of box experience (OOBE), etc.), firmware of the chipset level ID system instructs the secure driver component that no intrusion events should be detected in the log. As such, this avoids displaying an error to the user, and instead, the secure driver component initializes the log to a default inactive state. However, if the secure driver component responds that the log is non-existent or invalid, the firmware of the chipset level ID system instructs the secure driver to abort booting. This event may be treated as an intrusion event and the user may be provided a notification that an intrusion event may have occurred.

In some instances, and as part of rebooting the device after the intrusion event, the chipset level ID system may determine a downtime of the device. For example, if the chipset level ID system detects the intrusion event, such as the device being unplugged, and the device is later plugged in and connected, the remote device may know the actual downtime of the device (e.g., via receiving the indication of the intrusion event, the log, etc.). In some instances, if the downtime of the device is greater than or equal to a maximum downtime of the device, the chipset level ID system may treat the event as an intrusion event and perform the countermeasure(s). Comparatively, if the downtime is less than the maximum downtime, the event will not be considered as an intrusion event. In some instances, the maximum downtime may be associated with a normal, or expected, amount of time for a report-back rate of Eero to the remote device. This may avoid, for example, an unauthorized powering off the device, opening the device, and putting the device back together to gain access.

Moving to instances in which TEE is present, the chipset level ID system may be similar to the chipset level ID system within non-TEE, but instead of including the secure driver component and the countermeasure handler component, the operating system (OS) and a trusted application (TA) may perform the roles of the secured driver component and the countermeasure handler component. That is, the chipset level ID system may include the secure storage component, the bootloader component, the OS, and the TA. The secure storage component and the bootloader component may be the same, and perform the same functions, as when TEE is present. However, instead of including the secure driver component, the chipset level ID configured includes the OS for initializing the TA, notifying the TA of interrupts (e.g., via the GPIO pin(s)), and carrying out the countermeasures. As such, the OS may take the place of the secure driver component. The TA, as referenced, is initialized by the OS, is notified by the OS of the interrupts, and responds to the OS when an interrupt is detected for causing the countermeasures to be carried out. As such, the TA may take the place of the countermeasure handler component. In other respects the chipset level ID system when TEE is present and is not present, may be the same.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 including a device 102 having a chipset 104, according to examples of the present disclosure. The device 102 may represent any suitable device, such as a security camera, voice-enabled device, laptop, phone, and the like. Regardless of the specific implementation of the device 102, the device 102 includes the chipset 104 for performing a chipset level intrusion detection (ID) on the device 102. The chipset 104 as illustrated in FIG. 1 is an example of when the device 102 does not have, or does not operate, as a trusted execution environment (TEE).

The chipset 104 is configured to detect and respond to physical intrusions, physical interrupts, physical tampering, or any other physical manipulation of the device 102 or components thereof. As referred to herein, these physical intrusions of the device 102 may be treated at intrusion events, that is, intrusions to or of the device 102. As shown, the chipset 104, or more generally, the chipset level ID system when TEE is not present, may include a secure storage component 106, a bootloader component 108, a secure driver component 110, and a countermeasure handler component 112. The secure storage component 106, the bootloader component 108, the secure driver component 110, and the countermeasure handler component 112 may all be separate components on the chipset 104 for determining ID from the chipset level (i.e., at the chipset 104). In some instances, the secure storage component 106, the bootloader component 108, the secure driver component 110, and the countermeasure handler component 112 may be considered as a chipset level ID system.

Initially, ID configuration(s) 114 may be provided to the secure storage component 106. In some instances, the ID configuration(s) 114 are user defined (e.g., an user of the device 102), factory defined, and/or any combination thereof. The ID configuration(s) 114 may be associated with enabling ID at the chipset 104 and configuring the chipset 104 for ID. As will be explained herein, the ID configuration(s) 114 may be associated with the chipset 104 detecting and responding to the intrusion events at the device 102. The ID configuration(s) 114 may be stored on the secure storage component 106, which may represent a portion of memory of the device 102 with replay protection (e.g., RPMB for eMMC, RPMC for flash, etc.).

The bootloader component 108 may load the ID configuration(s) 114 from the secure storage component 106. For example, the bootloader component 108 may authenticate and load the ID configuration(s) 114, as well as load, authenticate, and run the secure driver component 110. The secure driver component 110 may initialize the countermeasure handler component 112 which, as discussed herein, may provide countermeasure(s) to the secure driver component 110 in response to the intrusion event being detected. The chipset level ID system may be interrupt-based, meaning that the chipset 104 may not run or consume power for ID during normal operation. However, when an interrupt is detected, the chipset 104 may operate and begin performing the countermeasures.

For example, the device 102 may include GPIO pin(s) 116 for providing interrupts. The GPIO pin(s) 116 are communicatively coupled to the secure driver component 110 and provide electrical signal(s) associated with the intrusion events. The electrical signal(s) include an appropriate voltage and polarity in order to trigger the intrusion event. In other words, when the GPIO pin(s) 116 are used to detect the intrusion event, in response, an electrical signal is sent as an interrupt to the secure driver component 110. When the secure driver component 110 receives the electrical signal indicating the interrupt, via one of the GPIO pin(s) 116, the secure driver component 110 notifies the countermeasure handler component 112 of the intrusion event.

The device 102 may include any number of GPIO pin(s) 116, and the chipset level ID system may be configured to detect the intrusion events via any number of the GPIO pin(s) 116. In some instances, the number of GPIO pin(s) 116 may be based at least in part on the type of the device 102 (e.g., voice-enabled device, security camera, etc.), specifics of the device 102 (e.g., hardware, sensor(s), cover(s), etc.), and so forth. In some instances, being as the secure driver component 110 may receive interrupts indicative of the intrusion events via the GPIO pin(s) 116, the GPIO pin(s) 116 may be specific to the device 102 itself. For example, the device 102 may include different latches, switches, sensors, etc. communicatively coupled to the GPIO pin(s) 116 and which are configured to provide interrupts in response to different types of intrusion events at the device 102, such as opening of a first cover of the device 102, opening of a second cover of the device 102, removing a battery of the device 102, disconnecting the device 102 from power, intruding the chipset 104 of the device 102, and so forth. The latches, switches, sensors, etc. of the device 102 may be connected to a corresponding GPIO pin 116, and in response to the latches, switches, sensors, etc. being tampered or physically manipulated, the secure driver component 110 may receive an indication of the interrupt via the corresponding GPIO pin 116. Based upon which GPIO pin 116 the secure driver component 110 receives the interrupt from may indicate the type of intrusion event detected, or where the intrusion event occurred on the device 102. Accordingly, the latches, switches, sensors, etc. connected to the GPIO pin(s), as well as the interrupts received, may be specific to the device 102.

As an example, the device 102 is shown including a first housing 118 and a second housing 120. The first housing 118 and the second housing 120 may removably couple to one another. For example, a battery of the device 102 may reside within the first housing 118, and removing the second housing 120 from the first housing 118 (e.g., via a twist and lock mechanism) may provide access to the battery as well as other internal components in the first housing 118 and/or the second housing 120. The removal or uncoupling of the second housing 120 from the first housing 118, for example, may be detected via a latch (or other sensor(s)) communicatively coupled to one of the GPIO pin(s) 116. In response, the corresponding GPIO pin 116 may provide the electrical signal (i.e., the interrupt) to the secure driver component 110 associated with the intrusion event (e.g., the uncoupling of the second housing 120).

In response to receiving the electrical signal indicative of the intrusion event, the secure driver component 110 may notify the countermeasure handler component 112. After being notified of the interrupt, the countermeasure handler component 112 may respond to the secure driver component 110 as to the countermeasure(s) to be carried out. In some instances, the countermeasure(s) include, but are not limited to, logging a time stamp of the intrusion event, powering off the device 102, clearing secrets, keys, credentials, and/or other sensitive information stored on the device 102, cryptographically signing and sending an ID log of the intrusion events to a remote device 122, and so forth. Other countermeasure(s), however, may additionally or alternatively be envisioned. In some instances, the countermeasure(s) may be configured, or set, by a user (e.g., owner of the device 102, authorized user, etc.) and saved on the secure storage component 106 of the device 102 in accordance with the ID configuration(s).

For example, the user of the device 102 may determine the countermeasure(s) to be performed in response to the intrusion event. In some instances, the user may set different countermeasure(s) depending upon the type of intrusion event detected. For example, for a first type of intrusion event (e.g., loss of power), first countermeasure(s) may be performed, and for a second type of intrusion event (e.g., opening of a cover), second countermeasure(s) may be performed. The user may have the ability to set the countermeasure(s), as well as the number of countermeasure(s) to be performed. Additionally, the user may define the types of interrupts that the secure driver component 110 is configured to receive, or the types of interrupts that the GPIO pin(s) 116 are configured to detect. For example, while the GPIO pin(s) 116 may include any number (e.g., one, four, six, etc.) for detecting different intrusion events, and accordingly, the secure driver component 110 may be capable of receiving different interrupts from the GPIO pin(s) 116, the user of the device 102 may limit interrupts to an uncoupling of the second housing 120 from the first housing 118. The user may therefore configure the device 102 according to certain intrusion events.

The secure driver component 110, in response to the interrupt, may store an indication of the intrusion event in the secure storage component 106. In some instances, the indication may be stored as part of a log on the secure storage component 106, where the log may track and record the intrusion events detected or occurred at the device 102. The intrusion events in the log may be associated with a time, a type, and/or other information. For example, in response to the interrupt being received, the secure driver component 110 may determine the time of the intrusion event, and store an indication of the intrusion event in the secure storage component 106. The intrusion event may be stored in association with other information, such as a battery power of the device at the time of the intrusion event. As such, the log may serve as a history of intrusion events detected at the device 102.

In addition to the log being stored locally at the device 102, on the secure storage component 106, the secure driver component 110 may also send (e.g., upload) the log of intrusion events to the remote device 122 via one or more network(s) 124. The secure driver component 110 may cryptographically sign the log and may be used by the remote device 122 for attestation. For example, the log may be sent to the remote device 122 and used by the remote device 122 to attest to the intrusion events, or lack thereof, at the device 102. In this sense, the log as stored on the secure storage component 106 may be compared against the log as stored on the remote device 122, which is used to attest to the intrusion events, or lack thereof, at the device 102.

Importantly, however, the log may be used by the remote device 122, for example, to know that an intrusion event occurred, when the intrusion event occurred, as well as whether data generated from the device 102 is attested. For example, the device 102 may be equipped with various sensor(s), such as camera(s), microphone(s), passive infrared (PIR) sensor(s), and so forth. If an intrusion event occurred, data generated by the sensor(s) may be untrustworthy being as the device 102 may have been tampered with. In other words, based on the intrusion event being detected, the data generated by the sensor(s) may not be attested to by the remote device 122. On the other hand, if the device 102 has not be tampered with, the log is used to attest to the trustworthiness of the data generated via the device 102.

The user may also be notified, or provided with an indication, of the intrusion event. For example, in response to detecting the intrusion event, the secure driver component 110 may communicate with a user device 126. In some instances, the remote device 122 communicates with the user device 126 for providing the notification of the intrusion event. In some instances, the user may have the ability to respond to the intrusion event, such as causing the countermeasure(s) to be performed, terminating the countermeasure(s), and so forth. The notification may additionally or alternatively include information associated with the intrusion event, such as a time associated with the intrusion event, the type of intrusion event, and so forth.

In some instances, the device 102 is configured to detect event(s) in addition to intrusion events, and not all event(s) may be considered an intrusion event for carrying out the countermeasure(s). For example, authorized users (e.g., the user, service technician, etc.) may service or otherwise perform maintenance on the device 102. During routine maintenance a user, for example, may replace a battery of the device 102 that has been depleted. Here, the secure driver component 110, may sense the interrupt based on the first housing 118 and the second housing 120 being decoupled (e.g., to provide the user with access to the battery). In response, the user may receive a notification on the user device 126 indicating the interrupt (or a potential intrusion event). The user, via providing input to the user device 126, may verify their identity, provide a password, etc. and in response, the event will not be considered as an intrusion event and the countermeasures may not be undertaken. However, the event may be recorded in the log on the secure storage component 106, and/or sent to the remote device 122, but the event itself may not be considered an intrusion event. Importantly, however, this event has the effect of continuing to trust the data generated by the device 102 (e.g., the device 102 has not been tampered with), in comparison to an intrusion event being detected. Moreover, the countermeasure(s) are not undertaken when the user has confirmed their identity, provided a password, etc. As such, the log may indicate all event(s) experienced at, or by, the device 102, but only certain events may be considered an intrusion event. The secure driver component 110 may therefore wait for a response from the user device 126 before instituting the countermeasure(s). In some instances, the secure driver component 110 may wait for a threshold period of time before notifying the countermeasure handler component 112 as to the interrupt, and therein causing the countermeasure(s) to be performed. The threshold period of time may be set by the user as part of the ID configuration(s) 114.

As will be explained herein, in instances in which TEE is present the chipset 104 may include an operating system (OS) that performs the functions of the secure driver component 110 when TEE is not present, and may include a trusted application (TA) that performs the functions of the countermeasure handler component 112 when TEE is not present. As such, when TEE is present, the OS may take the place of the secure driver component 110 and TA may take the place of the countermeasure handler component 112. Other components of the chipset 104, or the chipset level ID system, may be the same when TEE is present and when TEE is not present.

Figure 2A:
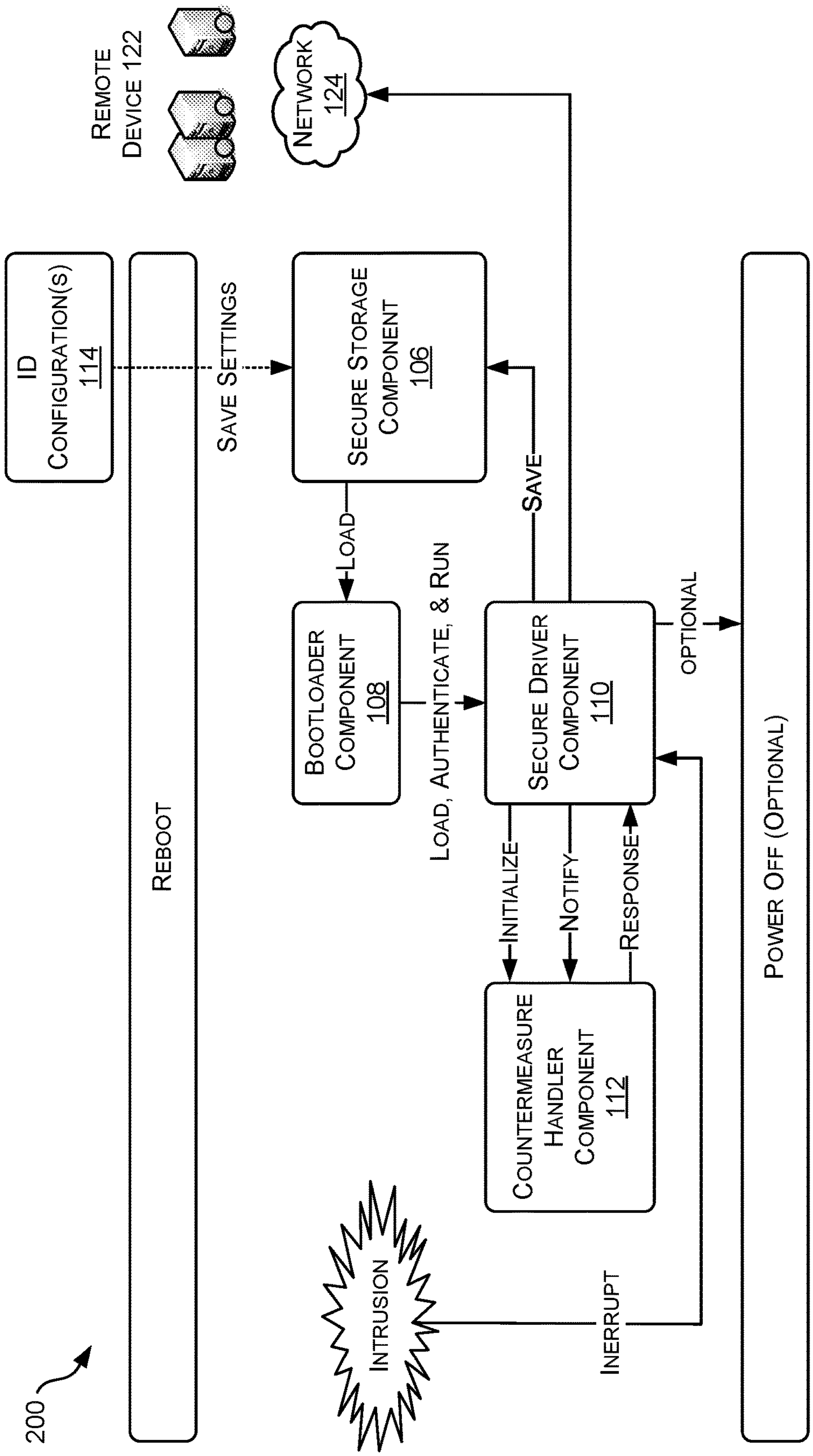
FIG. 2A illustrates an example architecture of the chipset level ID system of FIG. 1 when a trusted execution environment (TEE) is not present, according to examples of the present disclosure.

FIG. 2A illustrates an architecture 200 of the chipset 104, according to examples of the present disclosure. The architecture 200 of the chipset 104 as illustrated in FIG. 2A may be when TEE is not present on the device 102.

The secure storage component 106, the bootloader component 108, the secure driver component 110, and the countermeasure handler component 112 are introduced above with regard to FIG. 1. As illustrated, the ID configuration(s) 114 are provided to the secure storage component 106 as setting(s), and the setting(s) are saved on the secure storage component 106. The secure storage component 106 may include replay protection, for example, and may be embedded on a portion of memory of the device 102. The ID configuration(s) 114 may be stored in secure non-volatile storage of the secure storage component 106 in the form of token to be used by the bootloader component 108.

As non-limiting examples, the ID configuration(s) 114 that are stored as the setting(s) may include whether ID on the chipset 104 is enabled or disabled, countermeasure(s) to be undertaken in response to detecting an intrusion event, creating the log of the intrusion events, and so forth. The ID configuration(s) 114 may be user-defined and/or factory-defined, and the chipset 104 is configured to carry out or operate according to the ID configuration(s) 114. In some instances, the user may interact with the user device 126 to provide the ID configuration(s) 114 (e.g., via a configuration setup page) which is access protected (e.g., password protected). Once the ID configuration(s) 114 are stored, the chipset 104 may perform a reboot. In some instances, rebooting the device 102 permits new or updated ID configuration(s) 114 to be launched from a beginning of the boot sequence.

Upon reboot, the bootloader component 108 authenticates and loads the ID configuration(s) 114. In some instances, the bootloader component 108 authenticates the ID configuration(s) 114 using RSA and/or ECC or other asymmetric cryptographic algorithms. Without losing generality, for example, the ID configuration(s) 114 may be stored on the secure storage component 106 in association with signatures.

In some instances, where a hash value generated based on an ID configuration was previously used together with a key (e.g. a private key) to generate a signature that is then stored in association with content data representing the ID configuration, to authenticate the content data representing the ID configuration, the signature may be decrypted (e.g. with a public key) to determine a decrypted hash value for the content data, and the content data may be used to generate a new hash value for the content data, with the new hash value being compared to the decrypted hash value to authenticate the content data.

The bootloader component 108 also loads, authenticates, and runs the secure driver component 110, via providing the ID configuration(s) 114 to the secure driver component 110. The secure driver component 110 then initializes the countermeasure handler component 112. At this point, the chipset 104 may await interrupts received by the secure driver component 110, however, the ID configuration(s) 114 have been propagated throughout the chipset 104 for responding and instituting the countermeasure(s) when the interrupt is detected.

In some instances, such as when the device 102 is first utilized and/or configured with the ID configuration(s) 114 (e.g., the device 102 is brand new), the secure storage component 106 may not have any indications of the intrusion events. Here, the secure driver component 110 may initialize the log to have zero (0) instruction events as well as the ID configuration(s) 114 that indicate the ID is disabled. This ensures that tampering of the log, even if detection of the intrusion event(s) is disable, may be detected. If there is no log on the secure storage component 106, the secure driver component 110 may create the log and may not treat the absence of the log as an error. As such, if ID has yet to be configured on the chipset 104, the secure driver component 110 may know that it should expect to find no log of intrusion events in the secure storage component 106. However, if the secure driver component 110 determines that the log is non-existent or invalid, the chipset 104 may refrain from booting to avoid propagation. Instead, a notification may be provided to the user indicating that an intrusion event may have occurred and that the ID configuration(s) 114 may have been tampered.

When an intrusion event occurs, an electric signal is generated to an internal pin of the chipset 104 as an interrupt. The electrical signal trips a status value of on the intrusion event on the log, and correspondingly, triggers the interrupt to the chipset 104. The secure driver component 110 saves an indication of the interrupt in the secure storage component 106, with a time stamp at which the intrusion event occurred, a battery power of the battery (if appropriate), a type of the interrupt, and so forth. Additionally, the secure driver component 110 interacts with the countermeasure handler component 112, such as notifying the countermeasure handler component 112, for determining the countermeasure(s). In some instances, the countermeasure handler component 112 determines a notify-response model, that is, how the chipset 104 should notify and respond to the interrupt. Therein, the countermeasure handler component 112 and/or the secure driver component 110 may carry out the countermeasure(s).

The countermeasure(s) may include recording a time stamp of the interrupt (as indicated above), for use in trusting or verifying data generated by the device 102. For example, after the time stamp, video data and audio data generated by components of the device 102 may no longer be trustworthy due to the detection of the intrusion event. Additionally, the countermeasure(s) may optionally include powering off the device 102 to protect sensitive information stored on the device 102 and which may be extracted by unauthorized access. In some instances, the countermeasure(s) may also include erasing secrets, keys, and/or user credentials in memory of the device, as well as forcing a reboot of the device 102. As another example, the countermeasure(s) may include cryptographically signing the log and sending the log to the remote device 122. In some instances, the countermeasure(s) may be user-defined and/or factory-defined, and different types of intrusion events may have different countermeasure(s).

After the intrusion event is detected, the user may be notified, for example, indicating that the device 102 has been tampered with. In some instances, after an authorized party regains control of the device 102, the log of intrusion events may be reviewed.

Figure 2B:
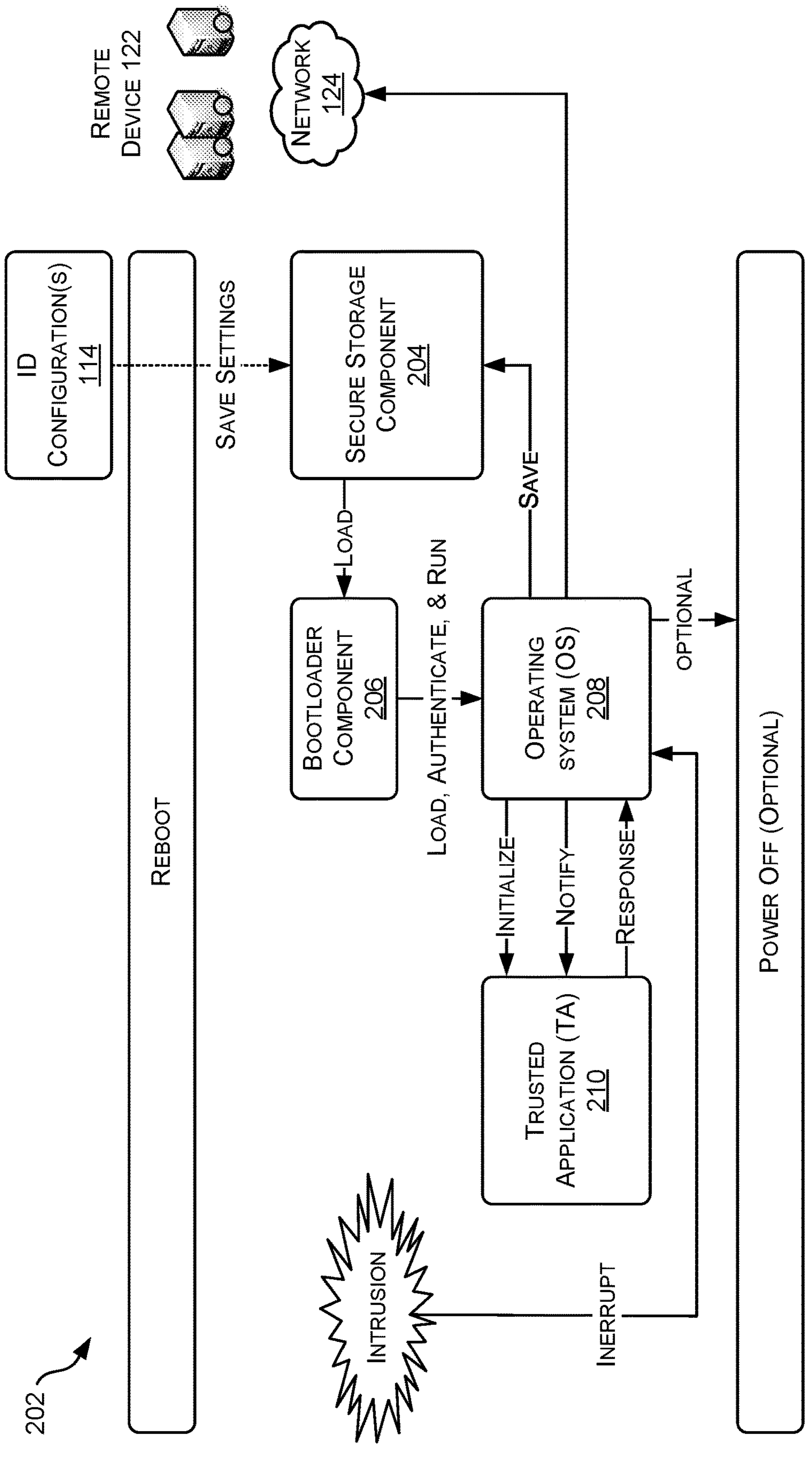
FIG. 2B illustrates an example architecture of the chipset level ID system of FIG. 1 when a TEE is present, according to examples of the present disclosure.

FIG. 2B illustrates an architecture 202 of the chipset 104, according to examples of the present disclosure. The architecture 202 of the chipset 104 as illustrated in FIG. 2B may be when TEE is present on the device 102.

The architecture 202 includes a secure storage component 204 and a bootloader component 206. The secure storage component 204 may be similar to the secure storage component 106 and/or the bootloader component 206 may be similar to the bootloader component 108. For example, the ID configuration(s) 114 are provided to the secure storage component 204 as setting(s), and the setting(s) are saved on the secure storage component 204. Once the ID configuration(s) 114 are stored, the chipset 104 may perform a reboot. In some instances, rebooting the device 102 permits new or updated ID configuration(s) 114 to be launched from a beginning of the boot sequence. Upon reboot, the bootloader component 206 authenticates and loads the ID configuration(s) 114. If the ID configuration(s) 114 are authenticated, an operating system (OS) 208 may safely load the ID configuration(s) 114. Alternatively, if the ID configuration(s) 114 are not authenticated, this may indicate a tampering of the ID configuration(s) 114 and the ID configuration(s) 114 may not be propagated throughout the remaining components of the chipset 104 (e.g., the OS 208).

The bootloader component 206 also loads, authenticates, and runs the OS 208, via providing the ID configuration(s) 114 to the OS 208. The OS 208 may be trusted when TEE is present. The OS 208 may be embedded software operating on the chipset 104. The OS 208 then initializes a trusted application (TA) 210 when the TEE is present. At this point, the chipset 104 may await interrupts received by the OS 208 (e.g., via the GPIO pin(s) 116, however, the ID configuration(s) 114 have been propagated throughout the chipset 104 for responding and instituting the countermeasure(s) when the interrupt is detected.

When an intrusion event occurs, an electric signal is generated to an internal pin of the chipset 104 as an interrupt. The electrical signal trips a status value of on the intrusion event on the log, and correspondingly, triggers the interrupt to the chipset 104. OS 208 saves an indication of the interrupt in the secure storage component 204, with a time stamp at which the intrusion event occurred, a battery power of the battery (if appropriate), a type of the interrupt, and so forth. Additionally, the OS 208 interacts with the TA 210, such as notifying the TA 210, for determining the countermeasure(s). In some instances, the TA 210 determines a notify-response model, that is, how the chipset 104 should notify and respond to the interrupt. Therein, the TA 210 and/or the OS 208 carry out the countermeasure(s).

As such, between the architecture 200 and the architecture 202, in instances in which TEE is present the chipset 104 may include the OS 208 that performs the functions of the secure driver component 110, and may include TA 210 that performs the functions of the countermeasure handler component 112. As such, when TEE is present, the OS 208 may take the place of the secure driver component 110 and TA 210 may take the place of the countermeasure handler component 112. Other components of the chipset 104, or the chipset level ID system, may be the same when TEE is present and when TEE is not present.

Figure 3A:
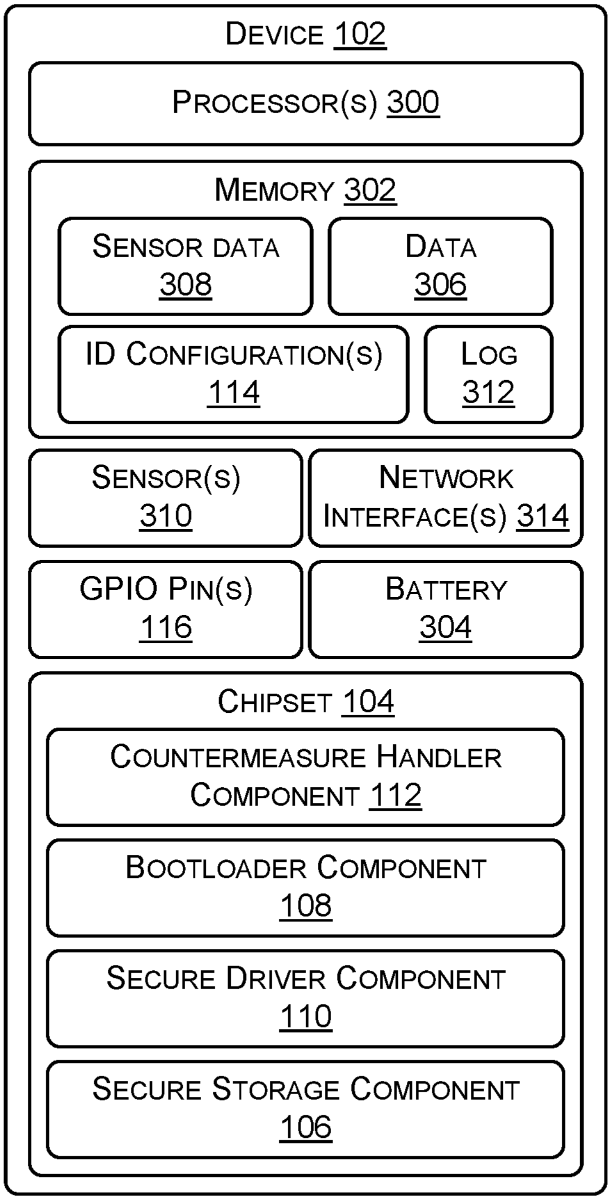
FIG. 3A illustrates select components of the device and the chipset level ID system of FIG. 1 when a TEE is not present, according to examples of the present disclosure.

FIG. 3A illustrates a component diagram of the device 102, according to examples of the present disclosure. In some instances, the component diagram of the device 102 of FIG. 3A is associated with when TEE is not present. The device 102 including processor(s) 300 and memory 302, where the processor(s) 300 may perform various functions and operations associated with detecting and responding to interrupt(s), or intrusion events, and the memory 302 may store instructions executable by the processor(s) 300 to perform the operations described herein. As introduced above, the device 102 includes the chipset 104 that is configured to determine interrupt(s) via the one more GPIO pin(s) 116 for use in carrying out one or more countermeasure(s). The chipset 104, or the chipset level ID system of the device 102, includes the secure storage component 106, the bootloader component 108, the secure driver component 110, and the countermeasure handler component 112. The secure storage component 106, the bootloader component 108, the secure driver component 110, and the countermeasure handler component 112 may all be located on the chipset 104 (e.g., motherboard, main CPU, etc.) of the device 102.

In some instances, the secure storage component 106 represents a replay-protected portion of the memory 302. For example, the secure storage component 106 may be embedded on a portion of the memory 302. In some instances, the secure storage component 106 may be stored on 12 Bytes of the memory 302, and each event detected may be stored on an additional 12 Bytes of the memory 302. For example, the secure storage component 106, or the data stored thereon, may consist of two portions. The first portion may be associated with the ID configuration(s) 114, which is stored on 12 Bytes of the memory 302. As discussed above, the ID configuration(s) 114 may be associated with the countermeasure(s) undertaken in response to the intrusion event. The second portion may be associated with ID run-time data, and may be 12 Bytes of the memory 302 for storing data associated with the intrusion event, such as time, type, percentage of battery life, etc.

The ID configuration(s) 114 are stored in secure non-volatile storage of the memory 302 with replay-protection (e.g., RPMB for eMMC or RPMC for Flash) in the form of a token to be used by bootloader component 108. Initially, however, to enable and configure ID, a user may enter a configuration setup page which is access protected (e.g., password protected). The user may define whether ID is enabled or disabled and/or whether upon detection, the countermeasures that are undertaken. For example, the ID configuration(s) 114 may indicate whether ID is enabled or not, whether to log intrusion events, whether to clear secure keys and credentials upon detection of an intrusion event, forcibly power off the device 102, and so forth. The ID configuration(s) 114 also indicate a threshold amount of time the user is permitted to authenticate themselves, or override the intrusion event, in the event that the intrusion event is detected and prior to the countermeasure(s) being carried out. Still, the ID configuration(s) 114 may indicate the types of intrusion event(s) the chipset 104 is configured to detect, which may be based on specifics of the device 102. Example types of intrusion events that the chipset 104 is configured to detect, via interrupts received from the GPIO pin(s) 116, may include an physical manipulation/intrusion against the chipset 104 (e.g., planting a malicious code), an physical manipulation/intrusion of the device 102 (e.g., opening a cover, compartment, etc.), an exhaustion of a battery 304 of the device 102, and/or a disconnect from power. However, although certain types of intrusion events are described, other intrusion events may be detected. The GPIO pin(s) 116 may be configured accordingly, one pin for each type of intrusion event that the chipset 104 is configured to detect. As such, the chipset 104 may operate according to the ID configuration(s) 114, which may be user-defined and/or factory-defined.

The bootloader component 108 authenticates and loads the ID configuration(s) 114 from the secure storage component 106. Additionally, the bootloader component loads, authenticates, and runs the secure driver component 106 once the ID configuration(s) 114 are authenticated. The bootloader component 108 also forwards the ID configuration(s) 114 onto the secure driver component 110. In some instances, the chipset 104 may operate the secure driver component 110 and the countermeasure handler component 112 only after an interrupt is detected. For example, the ID may be considered interrupt-based, meaning that the ID may not run and consume power until an intrusion event is detected.

The memory 302 is further shown storing data 306, which may correspond to keys, user credentials, secrets, etc. The data 306 may be sensitive information stored on the device 102, which in some instances, may be deleted, erased, cleared, etc. in response to an intrusion event and as indicated by the ID configuration(s) 114. Of course, however, the data 306 may represent or include other information. Furthermore, the memory 302 may store sensor data 308 generated by various sensor(s) 310 (e.g., camera(s), microphone(s), etc.) of the device 102. The sensor data 308 may be audio data, video data, image data, etc. generated by the sensor(s) 310. In some instances, the sensor data 308 may be deleted in response to the intrusion event, and as set by the ID configuration(s) 114.

The memory 302 further stores a log 312, which may represent a log of intrusion events, or more generally, events, detected by the chipset 104. In some instances, the log 312 may indicate the events, whether the event corresponds to an intrusion event, a number of events, a type of the event (e.g., opening cover, battery exhaustion, etc.), a time associated with the event, an amount of battery power when the event occurred, and so forth. Recording the time of the intrusion event, within the log 312, is used for a trustworthiness of the sensor data 308 generated from the sensor(s) 310. For example, upon detection of an intrusion event, the video data and audio data may be untrustworthy. The log 312 may be cryptographically signed and provided to the remote device 122 as part of the remote-attestation.

The device 102, including the chipset 104, may communicate with the remote device 122, as well as other device(s), via one or more network interface(s) 314. In some instances, the device 102 may provide the data 306, the log 312, the sensor data 308, and/or other information to the remote device 122. In some instances, the one or more network interface(s) 314 may operate in conjunction with one or more wireless units to implement one or more of various wireless technologies, such as Wi-Fi, Bluetooth, RF, cellular, satellite, NFC (near-field communication), RFID (radio frequency identification), etc.

In some instances, the remote device 122 may be implemented as one or more servers and may, in some instances form a portion of a network-accessible computing platform implemented as a computing infrastructure of processors, storage, software, data access, and so forth that is maintained and accessible via the network 124 such as the Internet. Cloud-based systems may not require end-user knowledge of the physical location and configuration of the system that delivers the services. Common expressions associated for the remote device 122 include “on-demand computing”, “software as a service (SaaS)”, “platform computing”, “network-accessible platform”, “cloud services”, “data centers”, and so forth.

Although the chipset 104, the processor(s) 300, and the memory 302 are shown being separate components on the device 102, it is to be understood that the chipset 104 may include one or more of the processor(s) 300 and/or the memory 302, or operate a portion of the processor(s) 300 and/or have access to a portion of the memory 302, for carrying out the operations of the chipset 104 and components thereof (e.g., the secure driver component 110, the countermeasure handler component 112, etc.).

As used herein, a processor, such as the processor(s) 300, may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 302, may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3B:
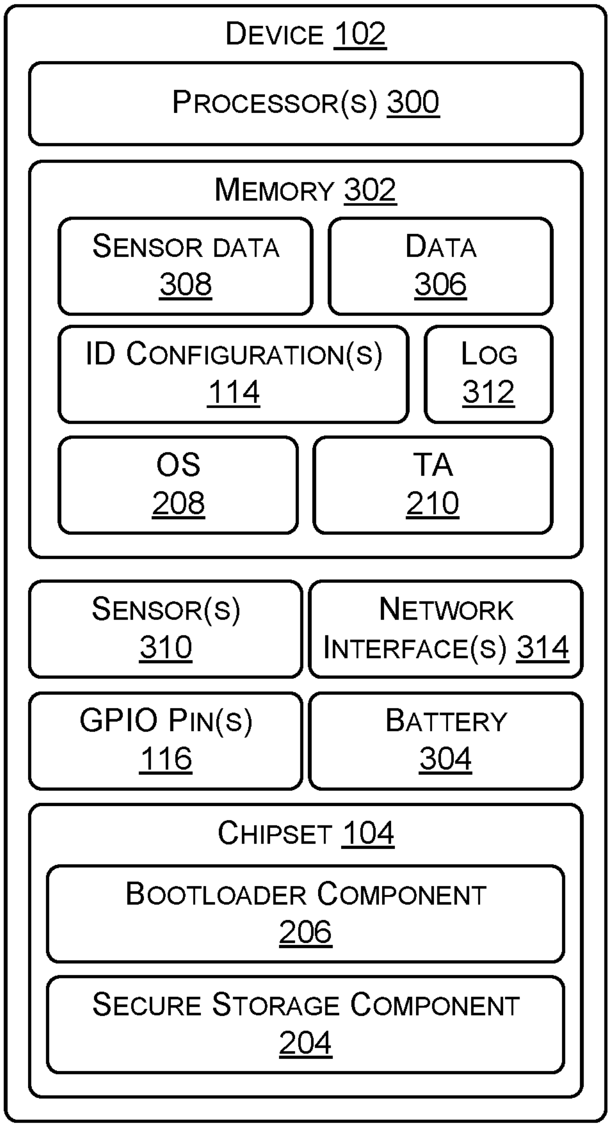
FIG. 3B illustrates select components of the device and the chipset level ID system of FIG. 1 when a TEE is present, according to examples of the present disclosure.

FIG. 3B illustrates a component diagram of the device 102, according to examples of the present disclosure. In some instances, the component diagram of the device 102 in FIG. 3B is associated with when TEE is present. The component diagram of the device 102 when TEE is present may be similar to the component diagram of the device 102 when TEE is not present. For example, the device 102 may include the processor(s) 300, the memory 302, which stores or has access to the ID configuration(s) 114, the data 306, the sensor data 308, and/or the log 312. Additionally, the device 102 has the GPIO pin(s) 116, the battery 304, the sensor(s) 310, the network interface(s) 314. However, as shown, the chipset 104, when TEE is present, includes the bootloader component 206 and the secure storage component 204. That is, instead of including the secure driver component 110 and the countermeasure handler component 112, the device 102 may instead include the OS 208 and the TA 210. The OS 208 may be embedded software operating on the chipset 104. Here, the OS 208 and the secure driver component 110 may perform similar functions, but the OS 208 may be implemented when TEE is present and the secure driver component 110 may be implemented when TEE is not present. Similarly, the TA 210 and the countermeasure handler component 208 may perform similar functions, but the TA 210 may be implemented when TEE is present and the countermeasure handler component 112 may be implemented when TEE is not present. Whether a device includes a TEE or not may be during manufacturing of the device. As such, devices may be configured with different chipsets depending upon whether TEE is present.

FIGS. 4-7 illustrate various processes for determining intrusion events and/or instituting countermeasure(s). The processes described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-3B, although the processes may be implemented in a wide variety of other environments, architectures, devices, and systems.

Figure 4:
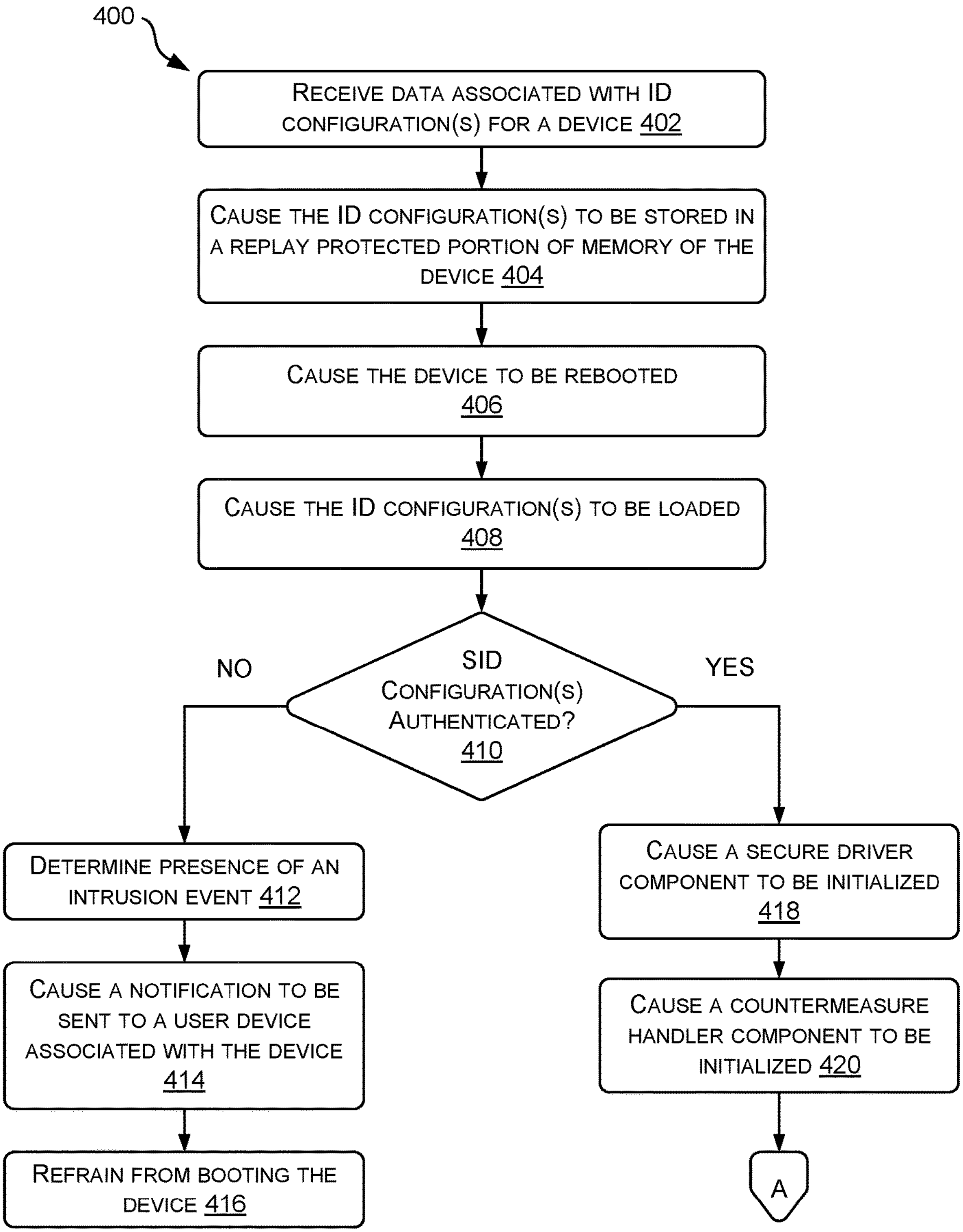
FIGS. 4 and 5 illustrate an example process for detecting and responding to an intrusion event using the chipset level ID system of FIG. 1, according to examples of the present disclosure.
Figure 5:
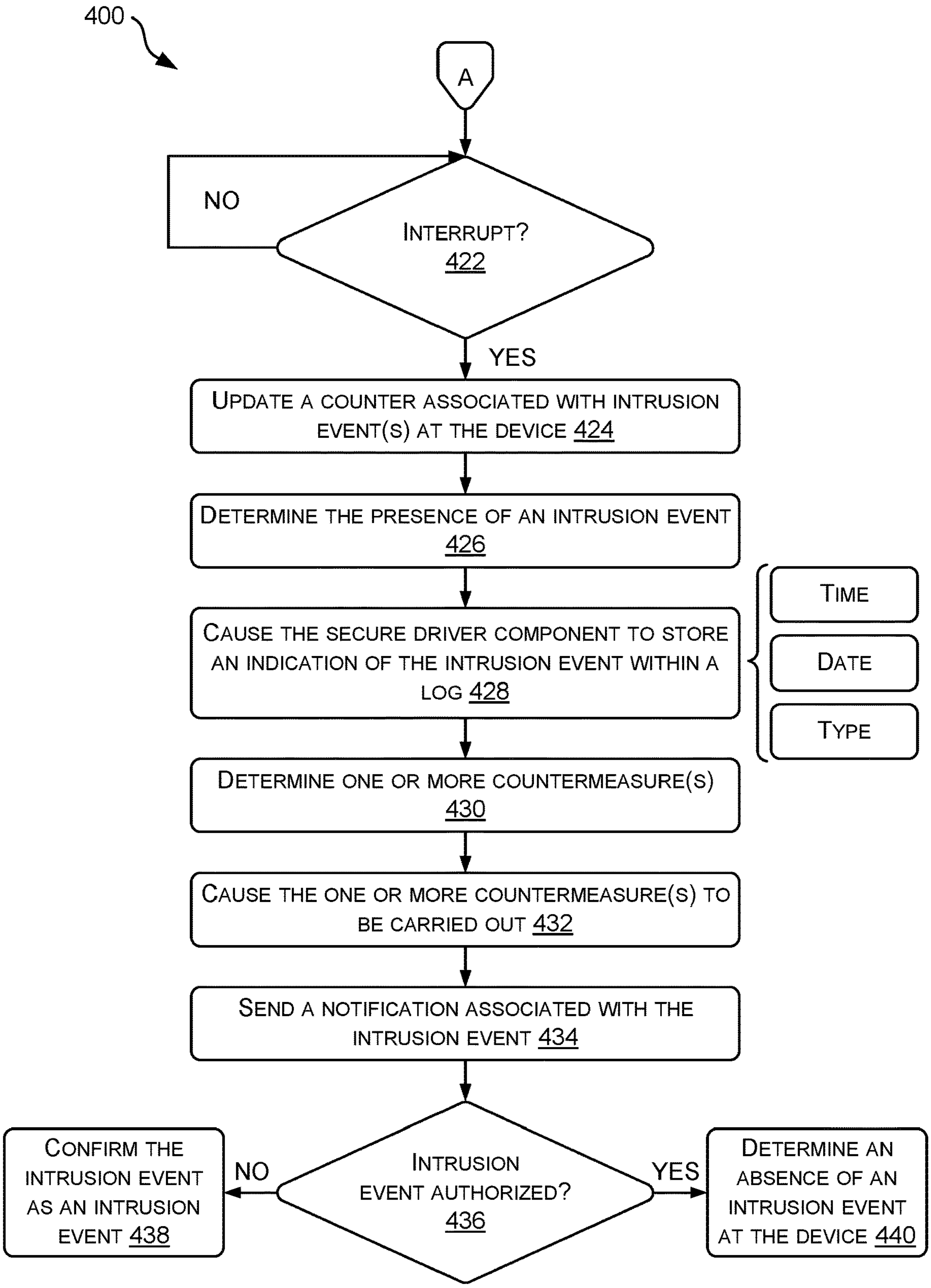

FIGS. 4 and 5 illustrate an example process 400 for configuring the chipset 104 to detect and respond to intrusion events, according to examples of the present disclosure. In FIGS. 4 and 5, the process 400 is described with regard to when TEE is not present. As such, the chipset 104 may include the secure driver component 110 and the countermeasure handler component 112. However, it is to be understood that the process 400 may be performed when TEE is present. In such instances, the OS 208 may perform or carry out the operations of the secure driver component 110, and the TA 210 may carry out the operations of the countermeasure handler component 112.

At 402, the process 400 may include receiving data associated with ID configuration(s) for a device. For example, the user may define the ID configuration(s) 114 during set up of the device 102, or ID. As non-limiting examples, the ID configuration(s) 114 may indicate whether ID on the device 102 is enabled or disabled, the types of events, or intrusion event(s), that the chipset 104 of the device 102 is configured to detect (e.g., via interrupts and the GPIO pin(s) 116), the countermeasure(s) to undertake in response to the intrusion event, and so forth.

At 404, the process 400 may include causing the ID configuration(s) to be stored in a replay protected portion of memory of the device. For example, the ID configuration(s) 114 may be stored on a replay protected portion of the memory 302, on the secure storage component 106 of the chipset 104. In some instances, the ID configuration(s) 114 may be stored on 12 Bytes of the memory 302. In some instances, the ID configuration(s) 114 are stored in the form of token to be used by the bootloader component 108.

At 406, the process 400 may include causing the device to be rebooted. In some instances, the device 102 may be rebooted based at least in part on storing the ID configuration(s) 114. At 408, the process 400 may include causing the ID configuration(s) to be loaded. For example, upon reboot of the device 102, the bootloader component 108 may load the ID configuration(s) 114 from the secure storage component 106.

At 410, the process 400 may include determining whether the ID configuration(s) are authenticated. In some instances, the bootloader component 108 authenticates the ID configuration(s) 114 using RSA and/or ECC. For example, the ID configuration(s) 114 may be stored on the secure storage component 106 in association with signatures.

In some instances, where a hash value generated based on an ID configuration was previously used together with a key (e.g. a private key) to generate a signature that is then stored in association with content data representing the ID configuration, to authenticate the content data representing the ID configuration, the signature may be decrypted (e.g. with a public key) to determine a decrypted hash value for the content data, and the content data may be used to generate a new hash value for the content data, with the new hash value being compared to the decrypted hash value to authenticate the content data.

As such, if at 410 the process 400 determines that the ID configuration(s) are not authenticated, the process 400 may follow the "NO" route to 412. At 412, the process 400 may include determining a presence of an intrusion event at the device 102. For example, the chipset 104 may determine that because the ID configuration(s) 114 were not authenticated, that the ID configuration(s) 114 may have been tampered with.

At 414, the process 400 may include causing a notification to be sent to a user device associated with the device 102. For example, when the intrusion event is detected, the user may be notified via the user device 126. Additionally, at 416, as a result of detecting the intrusion event, the process 400 may include refraining from booting the device. For example, any error(s), tampering, etc. in the ID configuration(s) 114 may not be propagated throughout a rest of the chipset 104.

Alternatively, if at 410 the process 400 determines that the ID configuration(s) are authenticated, the process 400 may follow the "YES" route and proceed to 418. At 418, the process 400 may include causing a secure driver component to be initialized. For example, based at least in part on the ID configuration(s) 114 being authenticated by the bootloader component 108, the bootloader component 108 may initialize the secure driver component 110.

In some instances, if the device 102 is new, and the ID configuration(s) 114 have not been loaded onto the secure storage component 106 before, the secure driver component 110 may initialize the log 312 to contain zero (0) intrusion events. Additionally, in some instances, the initial ID configuration(s) 114 may indicate that the ID is disabled. That is, the user may have to enable the chipset 104 to monitor for intrusion event(s). Initializing the log 312 to contain zero (0) intrusion events ensures that tampering of the log 312 can be detected, even if the detection of the intrusion events is disabled. As such, if there is no log 312, the secure driver component 110 may create the log 312 for tracking intrusion events. Moreover, if intrusion detection has never been configured before (e.g., brand new system), the secure driver component 110 may be informed that no intrusion events should be detected in the log 312. In this scenario, the secure driver component 110 avoids displaying an error and initializes the log 312 to a default inactive state.

At 420, the process 400 may include causing a countermeasure handler component to be initialized. For example, the secure driver component 110 may initialize the countermeasure handler component 112. From 420, the process 400 may continue to "A," which is discussed in FIG. 5 as a continuation of the process 400. From "A" the process 400 continues to 422, whereby the process 400 may include determining whether an interrupt is received. For example, the secure driver component 110 is configured to receive electrical signals indicative of interrupts of levers, switches, etc. of the device 102. These interrupts may be associated with intrusion events at the device 102. The secure driver component 110 may be configured to receive any number of electrical signals across the GPIO pin(s) 116, where each GPIO pin 116 may sense a respective interrupt for generating an electrical signal. At 422, if the process 400 determines that an interrupt was not received, the process 400 may loop until an interrupt is received. At this point, however, the secure driver component 110 may not consume power until an interrupt is detected. That is, when an interrupt is detected and sent via the GPIO pin(s) 116, the secure driver component 110 may power on.

Alternatively, if at 422 the interrupt is detected, the process 400 may follow the "YES" route and proceed to 424. At 424, the process 400 may include causing a counter associated with intrusion event(s) at the device to be updated. For example, when the interrupt is received, a counter associated with counting (or registering) the intrusion event(s) may be updated. For example, if no intrusion events were previously detected at the device 102, and an interrupt is received, the counter may be updated to indicate one (1) intrusion event. Importantly, this update to the counter has the effect of determining the presence of the intrusion event.

At 426, the process 400 may include determining the presence of the intrusion event. For example, based at least in part on the counter being updated, via the interrupt, the secure driver component 110 may determine the presence of the intrusion event.

At 428, the process 400 may include causing the secure driver component to store an indication of the intrusion event within a log. For example, the secure driver component 110 may store, in the secure storage component 106, an indication of the intrusion event. In some instances, the indication as stored in the secure storage component 106 may indicate the time at which the intrusion event was detected, a date at which the intrusion event was detected, a type of the intrusion event (e.g., cover open, battery exhausted, etc.). However, other information may be stored in association with the intrusion event, such as a battery power of the device 102 when the intrusion event was detected.

At 430, the process 400 may include determining one or more countermeasure(s). For example, based at least in part on the occurrence of the intrusion event, the secure driver component 110 may notify the countermeasure handler component 112, which informs (e.g., instructs) the secure driver component 110 of the countermeasure(s) to be carried out. The countermeasure(s) may be determined via the ID configuration(s) 114 and may be set by the user. For example, the user may determine the number and type of countermeasure(s) to be carried out.

At 432, the process 400 may include causing the one or more countermeasure(s) to be carried out. For example, the secure driver component 110 may provide the time stamp of when the intrusion event occurred (e.g., as related to a trustworthiness of the sensor data 308 generated by the sensor(s) 310), clearing the data 306 (e.g., sensitive or secure information), cryptographically signing and sending an indication of the intrusion event to the remote device 122, and/or forcibly powering off the device 102 (e.g., to protect the data 306 that otherwise may be extracted by unauthorized person(s)).

At 434, the process 400 may include sending a notification associated with the intrusion event. For example, the secure driver component 110 may communicate with the remote device 122, via the one or more network interface(s) 314, associated with the intrusion event. The notification may be sent via the device 102, the remote device 122, or other intermediaries to the user device 126. Although the process 400 indicates that the notification is sent after the one or more countermeasure(s) are carried out, in some instances, the notification may be provided to the user device 126 prior to instituting the countermeasure(s) to permit the user to authorize the intrusion event (e.g., normal service or maintenance).

At 436, the process 400 may include determining whether the intrusion event was authorized. For example, the intrusion event may have been associated with an authorized user of the device 102 servicing the device 102 (e.g., replacing a battery, reconnecting to internet, etc.). In these instances, although the intrusion event was detected, the device 102 may not have been tampered with and the sensor data 308 generated by the sensor(s) 310 may still be trustworthy. In some instances, the intrusion event may be authorized by the user providing login credentials (e.g., password). Additionally, in some instances, the user may have predetermined amount of time to authorize the intrusion event. If at 436 the intrusion event is not authorized, the process 400 may follow the "NO" route and proceed to 438.

At 438, the process 400 may include confirming the intrusion event as an intrusion event. In some instances, confirming the intrusion event as an intrusion event includes continuing to treat the sensor data 308 as untrustworthy (e.g., being as the device 102 may have been tampered with). Alternatively, if at 436 the process 400 determines that the intrusion event was authorized, the process 400 may follow the "YES" route and proceed to 440. At 440, the process 400 may include determining an absence of the intrusion event. For example, because the intrusion event was authorized, the sensor data 308 generated via the sensor(s) 310 may be trustworthy.

Figure 6:
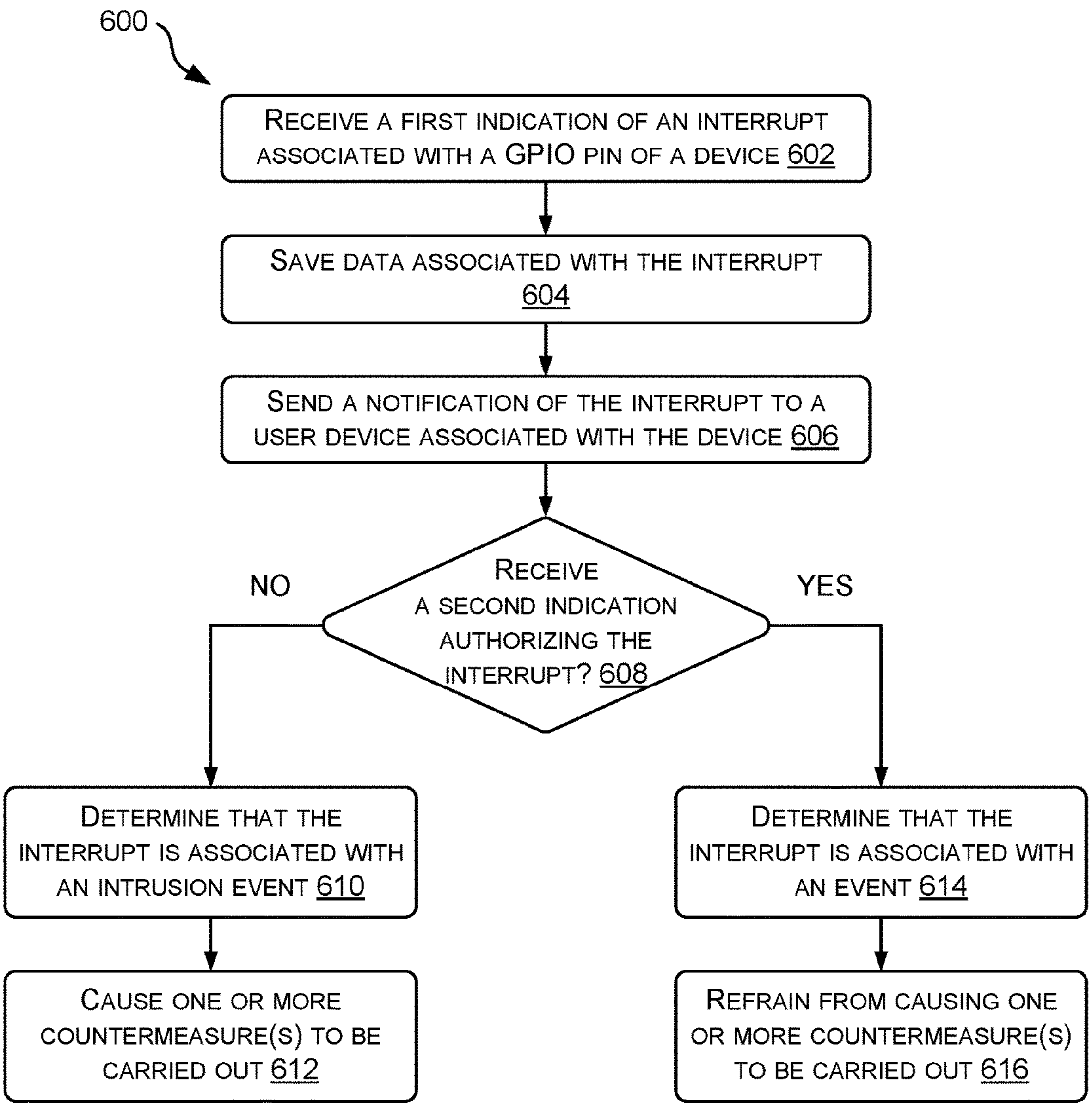
FIG. 6 illustrates an example process for detecting an intrusion event using the chipset level ID system of FIG. 1, and determining whether the intrusion event is authorized, according to examples of the present disclosure.

FIG. 6 illustrates an example process 600 associated with determining an interrupt at the device 102 and determining whether to the interrupt is authorized, according to examples of the present disclosure. In FIG. 6, the process 400 is described with regard to when TEE is not present. As such, the chipset 104 may include the secure driver component 110 and the countermeasure handler component 112. However, it is to be understood that the process 400 may be performed when TEE is present. In such instances, the OS 208 may perform or carry out the operations of the secure driver component 110, and the TA 210 may carry out the operations of the countermeasure handler component 112.

At 602, the process 600 may include receiving a first indication of an interrupt associated with a GPIO pin of a device. For example, the secure driver component 110, which is communicatively coupled to the GPIO pin 116, may receive an indication of the interrupt. The GPIO pin 116 may be connected with a corresponding sensor, switch, lever, etc. that sense the interrupt, and in turn, the interrupt (e.g., electrical signal) is received by the secure driver component 110.

At 604, the process 600 may include saving data associated with the interrupt. For example, when the secure driver component 110 receives the interrupt, the secure driver component 110 may store, in the secure storage component 106, an indication of the interrupt. In some instances, the secure driver component 110 may store a time, date, battery level of the device 102, etc. when the interrupt is detected.

At 606, the process 600 may include sending a notification of the interrupt to a user device associated with the interrupt. For example, the secure driver component 110 may cause, such as via the remote device 122, an notification of the interrupt to be provided to the user device 126. The notification may indicate that the interrupt was detected for use in allowing the user to authorize the interrupt or indicate that the interrupt was not authorized.

At 608, the process 600 may include determining whether a second indication is received associated with authorizing the interrupt. For example, the interrupt may be associated with an authorized user accessing the device 102, such as a changing the battery 304. In this example, the user may be authorized, but a tampering of the device 102 may have been detected via the interrupt. However, to avoid the countermeasure(s) being carried out, the user may authorize the interrupt, in which case, the countermeasure(s) may not be carried out. In some instances, the user (or other authorized person) may have a threshold amount of time to provide the second indication to authorize the interrupt (e.g., thirty seconds, one minute, etc. If at 608 the process 600 determines that the second indication was not received, the process 600 may follow the "NO" route and proceed to 610.

At 610, the process 600 may include determining that the interrupt is associated with an intrusion event. For example, because the interrupt was not authorized, the interrupt may be treated as an intrusion event. As a result, at 612, the process 600 may include causing one or more countermeasure(s) to be carried out. For example, the secure driver component 110 may notify the countermeasure handler component 112 for determining the countermeasure(s), and therein, causing the countermeasure(s) to be performed.

Alternatively, if at 608 the process 600 determines that the second indication was received, the process 600 may follow the "YES" route and proceed to 614. At 614, the process 600 may include determining that the interrupt is associated with an event. Here, the interrupt may still be recorded as in event in the log 312, but the event may not be considered an intrusion event. This has the effect of continuing to trust the sensor data 308 generated by the sensor(s) 310, being as the intrusion event was not detected. Accordingly, at 616, the process 600 may include refraining from causing the one or more countermeasure(s) to be carried out.

In some instances, the chipset 104 is configured to determine a downtime of the device 102 for use in detecting an intrusion event. Take, for example, a scenario where an authorized user turning off the device 102, opening the device to tamper or otherwise physically manipulate the device, and then reassembling the device 102. In this scenario, the chipset 104 would detect the loss of power, and record the loss of power in the log 312 and provide the log 312 (or the event) to the remote device 122. If the device 102 is unplugged and then later re-plugged in and connected, the remote device 122 will know the actual downtime of the device. If the downtime is greater than a threshold downtime, the chipset 104 may determine the intrusion event and the countermeasure(s) are performed. However, if the downtime is less than the threshold downtime, the chipset 104 may determine a lack of the intrusion event. In some instances, the threshold time may be associated with an expected or predetermined report-back rate of Eero to the remote device.

Figure 7:
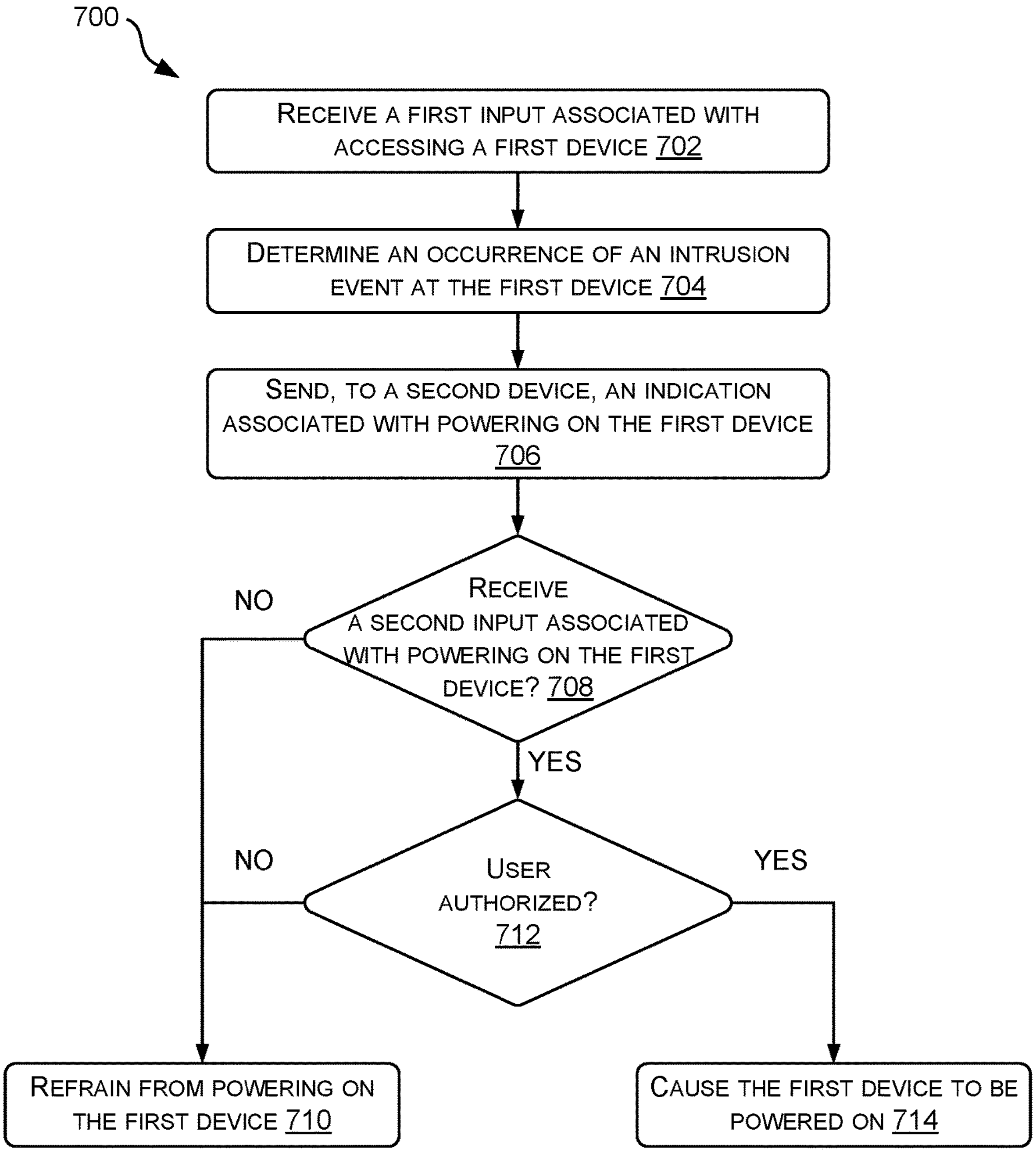
FIG. 7 illustrates an example process for authorizing a device to be powered on after an occurrence of an intrusion event, according to examples of the present disclosure.

FIG. 7 illustrates an example process 700 for powering on the device 102 after an intrusion event is detected, according to examples of the present disclosure. At 702, the process 700 may include receiving a first input associated with accessing a first device. For example, after an intrusion event, an user may attempt to power on the device 102. In some instances, the device 102 may be attempted to power on after the countermeasure(s) have been carried out, such as after the device 102 has been powered off. Accordingly, after the countermeasure(s) are performed, a user may attempt to regain access to the device 102, restore the device 102, and so forth.

At 704, the process 700 may include determining an occurrence of an intrusion event. For example, upon receiving the first input and attempting to power on the device 102, the device 102 or the remote device 122 may determine that an intrusion event happened at the device 102.

At 706, the process 700 may include sending, to a second device, an indication associated with powering on the first device. For example, the remote device 122 may transmit an indication to the user device 126 indicating that a user is attempting to access, power on, restore, etc. the first device after the intrusion event. In some instances, the indication may serve to allow an authorized user to approve of powering on the first device. For example, the indication may permit the user to verify their identity, and allow the first device to be powered on after the intrusion event.

At 708, the process 700 may include determining whether a second input is received associated with powering on the first device. For example, after sending the indication, the remote device 122 may await to see if an input is received for authorizing, verifying, or otherwise approving the first device to be powered on. In some instances, the remote device 122 may await a threshold amount of time to receive the second input, after which the remote device 122 may cause the device to power off. If at 708 the second input is not received, the process 700 may follow the "NO" route and proceed to 710.

At 710, the process 700 may include refraining from powering on the first device. For example, if the second input is not received, the process 700 may refrain from powering on the first device. Alternatively, if at 708 the process 700 determines that the second input was received, the process 700 may follow the "YES" route and proceed to 712.

At 712, the process 700 may include determining whether the user is authorized. For example, to prevent further intrusions to the first device, or permitting an unauthorized user to power on the first device after the intrusion event, the process 700 may determine whether the user is authorized. In some instances, whether the user is authorized may include providing a code to the user, or receiving a password and user name from the user device 126. For example, the indication sent to the user device 126 may include a field for the user to authorize themselves (e.g., via a password). Facial recognition or other verification methods may be used. If the user is not authorized, the process 700 may follow the "NO" route and proceed to 710. Alternatively, if at 712 the user is authorized, the process 700 may follow the "YES" route and proceed to 714 whereby the process 700 may permit the first device to be powered on.

Figure 8:
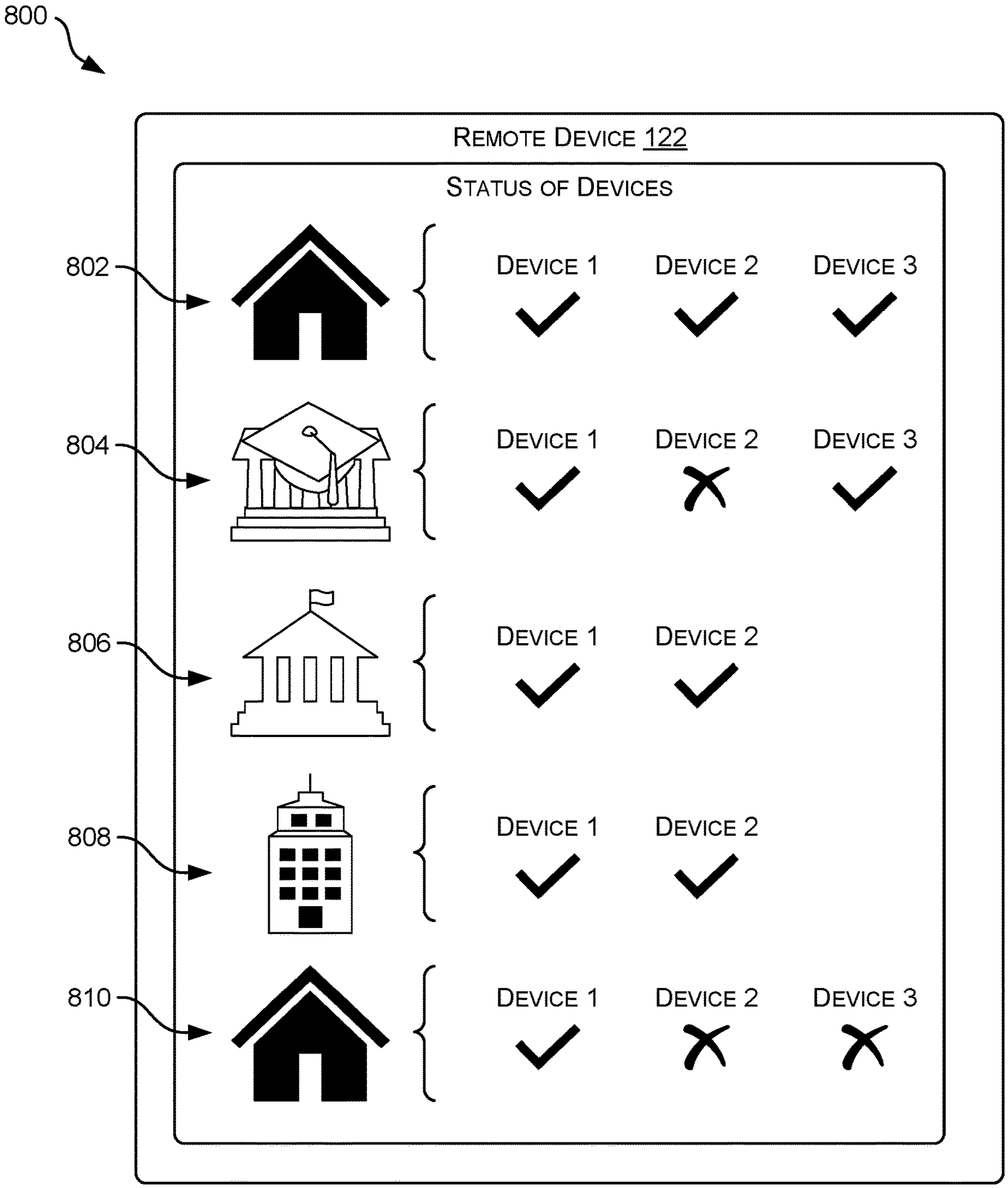
FIG. 8 illustrates an example interface for displaying statuses of devices, according to examples of the present disclosure.

FIG. 8 illustrates an example interface 800 for remotely attesting to various devices, according to examples of the present disclosure. The remote device 122 may be configured to receive, from a plurality of devices, the log 312 and/or indications of the intrusion events. The devices 102 that the remote device 122 is configured to receive the logs 312 from may include a variety of devices, such as televisions, voice-controlled devices, security cameras, home devices, cell phones, laptops, appliances, and so forth. Each of the devices 102, however, may include the chipset level ID system for detecting the intrusion events. The devices 102 may also be spread across or located within any number of dwellings, buildings, residences, etc., and within each location, any number of devices 102 may be included.

For example, a first location 802 (e.g., house) is shown including three devices, a second location 804 (e.g., educational building) is shown including three devices 102, a third location 806 (e.g., government building) is shown including two devices 102, a fourth location 808 (e.g., corporate building) is shown including two devices, and a fifth location 810 (e.g., house) is shown including three devices 102. Each of these locations, as shown, include respective devices having the chipset level ID system and reports to the remote device 122 such that, via the remote device 122, a snapshot of those devices 102 that have experienced an intrusion event and/or those devices 102 that have not experienced an intrusion event are determined. This snapshot may provide a graphical interface that indicates the health of the devices, those device(s) in which an intrusion event has been detected (e.g., x-mark, red icon, indication, etc.), those device(s) in which an intrusion event has not been detected (e.g., check mark, green icon, indication, etc.). This snapshot may be used by the user, administrator(s), etc. for serving the device(s), installing updates, commissioning or decommissioning device(s), and so forth. As such, the interface provide a system-level overview of the devices 102.

Although certain locations and/or certain devices are shown, the remote device 122 may display additional, less, or other locations, and the locations may include more than or less than the number of devices 102 as shown. Further, other graphical interfaces may be displayed (e.g., scrollable), icon-based, drop-down menus, map-based, etc. for viewing the devices 102 and their status.

As noted above, Intrusion Detection Systems (IDS) exist to monitor for malicious activity or policy violations on the devices. However, conventional IDS's are not conducted using a chipset level solution, thus requiring larger silicon die size and/or additional chipsets, RAM, memory footprints and a separate sub-system which greatly increases overall cost. In accordance with one or more preferred implementations, a chipset level solution obviates or ameliorates one or more of these issues.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An electronic device comprising:

a printed circuit board;

a controller coupled to the printed circuit board;

a sensor;

a chipset comprising a set of integrated circuit components coupled to the printed circuit board;

a line coupled to the sensor and to the chipset;

wherein the chipset includes one or more integrated circuit components storing processor executable instructions which, when executed by one or more processors, cause the electronic device to perform operations comprising:

receiving intrusion detection configuration settings, accessing a first cryptographic key stored at the set of integrated circuit components, generating a cryptographic signature based on the first cryptographic key and content data representing the intrusion detection configuration settings, storing, at the set of integrated circuit components, the cryptographic signature and the content data, based on booting of the device:

accessing the content data stored at the set of integrated circuit components, accessing the cryptographic signature stored at the set of integrated circuit components, authenticating the content data using the content data and the cryptographic signature, and based on the authenticating of the content data, loading the intrusion detection configuration settings using the content data, receiving an interrupt signal via the line, based on the receiving of the interrupt signal and the intrusion detection configuration settings:

determining a first time associated with the interrupt signal, and storing, at the set of integrated circuit components, event data indicating the first time.

2. The electronic device of claim 1, wherein the one or more integrated circuit components store processor executable instructions which, when executed by one or more processors, cause the electronic device to perform operations comprising generating, based on the content data, a first hash value, wherein the generating of the cryptographic signature is based on the first hash value.

3. The electronic device of claim 2, wherein the one or more integrated circuit components store processor executable instructions which, when executed by one or more processors, cause the electronic device to perform operations comprising:

determining, based on the cryptographic signature, a decrypted value;

determining, based on the content data, a second hash value; and comparing the decrypted value to the second hash value, wherein the authenticating of the content data is based on the comparing of the decrypted value to the second hash value.

4. The electronic device of claim 1, wherein the one or more integrated circuit components store processor executable instructions which, when executed by one or more processors, cause the electronic device to perform operations comprising sending, to a remote system, notification data indicating the first time.

5. The electronic device of claim 1, wherein the one or more integrated circuit components store processor executable instructions which, when executed by one or more processors, cause the electronic device to perform operations comprising generating, using the first cryptographic key, encrypted data indicating the first time; and sending, to a remote system, the encrypted data indicating the first time.

6. An electronic device comprising:

a printed circuit board;

a controller coupled to the printed circuit board;

a chipset comprising a set of integrated circuit components coupled to the printed circuit board;

a line coupled to the chipset;

wherein the chipset includes one or more integrated circuit components storing computer executable instructions which, when executed by one or more processors, cause the electronic device to perform operations comprising:

based on booting of the device:

accessing content data stored at the set of integrated circuit components, the content data representing intrusion detection configuration settings, accessing a cryptographic signature stored at the set of integrated circuit components, authenticating the content data using the content data and the cryptographic signature, and based at least in part on the authenticating of the content data, loading the intrusion detection configuration settings using the content data.

7. The electronic device of claim 6, wherein the one or more integrated circuit components store processor executable instructions which, when executed by one or more processors, cause the electronic device to perform operations comprising:

determining, based on the cryptographic signature, a decrypted value;

determining, based on the content data, a hash value; and comparing the decrypted value to the hash value, wherein the authenticating of the content data is based on the comparing of the decrypted value to the hash value.

8. The electronic device of claim 6, wherein the one or more integrated circuit processors, cause the electronic device to perform operations comprising:

receiving an interrupt signal via the line; and based on the receiving of the interrupt signal and the intrusion detection configuration settings:

determining a first time associated with the interrupt signal; and storing, at the set of integrated circuit components, event data indicating the first time.

9. The electronic device of claim 6, wherein the one or more integrated circuit components store processor executable instructions which, when executed by one or more processors, cause the electronic device to perform operations comprising:

receiving an interrupt signal via the line; and based on the receiving of the interrupt signal and the intrusion detection configuration settings:

determining a first time associated with the interrupt signal, and sending, to a remote system, notification data indicating the first time.

10. The electronic device of claim 6, wherein the one or more integrated circuit components store processor executable instructions which, when executed by one or more processors, cause the electronic device to perform operations comprising:

receiving an interrupt signal via the line; and based on the receiving of the interrupt signal and the intrusion detection configuration settings:

determining a first time associated with the interrupt signal;

generating, using the first cryptographic key, encrypted data indicating the first time; and sending, to a remote system, the encrypted data indicating the first time.

11. The electronic device of claim 6, wherein the one or more integrated circuit processors, cause the electronic device to perform operations comprising receiving an interrupt signal via the line; and based on the receiving of the interrupt signal and the intrusion detection configuration settings, power off the electronic device.

12. The electronic device of claim 6, wherein the one or more integrated circuit components store processor executable instructions which, when executed by one or more processors, cause the electronic device to perform operations comprising receiving an interrupt signal via the line; and based on the receiving of the interrupt signal and the intrusion detection configuration settings, disconnect a line providing power to the electronic device.

13. The electronic device of claim 6, wherein the one or more integrated circuit components store processor executable instructions which, when executed by one or more processors, cause the electronic device to perform operations comprising receiving an interrupt signal via the line; and based on the receiving of the interrupt signal and the intrusion detection configuration settings, force a reboot of the electronic device.

14. The electronic device of claim 6, wherein the one or more integrated circuit components store processor executable instructions which, when executed by one or more processors, cause the electronic device to perform operations comprising receiving an interrupt signal via the line; and based on the receiving of the interrupt signal and the intrusion detection configuration settings:

cause deletion of first data, and force a reboot of the electronic device.

15. The electronic device of claim 6, wherein the one or more integrated circuit processors, cause the electronic device to perform operations comprising receiving an interrupt signal via the line; and based on the receiving of the interrupt signal and the intrusion detection configuration settings, effect display of a notification on a display of the electronic device.

16. The electronic device of claim 6, wherein the electronic device comprises a latch coupled to the line.

17. The electronic device of claim 6, wherein the electronic device comprises a latch positioned to detect opening of a housing of the electronic device, the latch being coupled to the line.

18. The electronic device of claim 6, wherein the electronic device comprises one or more laser components arranged to detect opening of a housing of the electronic device, the one or more laser components being coupled to the line.

19. The electronic device of claim 6, wherein the electronic device comprises a camera.

20. The electronic device of claim 6, wherein the electronic device is a video doorbell device.

21. The electronic device of claim 6, wherein the electronic device comprises a speaker and a microphone array.

22. The electronic device of claim 6, wherein the electronic device comprises a tablet device, television device, e-reader device, voice assistant device, remote control device, video game controller device, robot device, drone device, or alarm device.

23. A device comprising:

a housing;

a battery residing at least partially within the housing;

a cover removably coupled to the housing to provide access to the battery;

a general purpose input/output (GPIO) pin configured to generate an electrical signal in response to the cover being decoupled from the housing; and a chipset including:

a secure storage component, a bootloader component, a secure driver component, a countermeasure handler component, a processor, and one or more computer readable media containing computer executable instructions that, when executed by one or more processors, cause the electronic device to perform operations comprising:

causing the bootloader component to load an intrusion detection (ID) configuration from the secure driver component, the ID configuration including at least one countermeasure to perform based at least in part on receiving the electrical signal, causing the bootloader component to authenticate the ID configuration, causing the bootloader component to initialize the countermeasure handler component, receiving, at the secure driver component from the GPIO pin, the electrical signal indicative of the cover being decoupled from the housing, causing the secure driver component to notify the countermeasure handler component of an intrusion event associated with the cover being decoupled from the housing, causing the secure driver component to record, in the secure storage component, an indication of the intrusion event, causing a notification to be provided to a user associated with the device, and causing the secure driver component to perform the at least one countermeasure.

24. The device of claim 23, wherein the at least one countermeasure includes:

causing the device to power off;

causing first data to be deleted from the memory;

causing second data associated with the intrusion event to be sent to a remote device; or cryptographically signing a log stored on the secure storage component associated with intrusion events detected at the device.

25. The device of claim 23, wherein the indication of the intrusion event is stored in association with at least one of:

a time at which the intrusion event was detected;

a date in which the intrusion event occurred;

a type of the intrusion event; or a charge of the battery at the time at which the intrusion event was detected.

26. The device of claim 23, further comprising a second GPIO pin, the operations further comprising:

receiving, at the secure driver component from the second GPIO pin, a second electrical signal;

causing the secure driver component to notify the countermeasure handler component of a second intrusion event;

causing the secure driver component to record, in the secure storage component, a second indication of the second intrusion event;

causing the secure driver component to perform the at least one countermeasure; and causing a second notification to be provided to the user.

27. The device of claim 23, the operations further comprising determining that a threshold amount of time has elapsed without receiving a second indication from the user associated with authorizing the intrusion event, and wherein causing the secure driver component to perform the at least one countermeasure is based at least in part on the threshold amount of time elapsing without receiving the second indication.

* * * * *